US012741811B2

(12) United States Patent
Reischl et al.

(10) Patent No.: US 12,741,811 B2
(45) Date of Patent: Sep. 22, 2026

(54) OVERHEAD CONVEYING DEVICE

(71) Applicant: TGW Logistics GmbH, Marchtrenk (AT)

(72) Inventors: Josef Reischl, Gunskirchen (AT); Christoph Pauzenberger, Neumarkt i. H. (AT)

(73) Assignee: TGW Logistics GmbH, Marchtrenk (AT)

(*) Notice: Subject to any disclaimer, the term of this patent is extended or adjusted under 35 U.S.C. 154(b) by 0 days.

(21) Appl. No.: 18/835,658

(22) PCT Filed: Feb. 3, 2023

(86) PCT No.: PCT/AT2023/060032
§ 371 (c)(1),
(2) Date: Aug. 2, 2024

(87) PCT Pub. No.: WO2023/147620
PCT Pub. Date: Aug. 10, 2023

(65) Prior Publication Data

US 2025/0153934 A1 May 15, 2025

(30) Foreign Application Priority Data

Feb. 4, 2022 (AT) .............................. A 50068/2022
Jun. 27, 2022 (AT) .............................. A 50463/2022

(51) Int. Cl.
*B65G 1/04* (2006.01)
*B65G 17/20* (2006.01)
(Continued)

(52) U.S. Cl.
CPC ......... *B65G 1/0457* (2013.01); *B65G 1/0464* (2013.01); *B65G 17/20* (2013.01);
(Continued)

(58) Field of Classification Search
CPC .... B65G 1/0457; B65G 1/0464; B65G 17/20; B65G 17/485; B65G 23/23; B65G 54/02
See application file for complete search history.

(56) References Cited

U.S. PATENT DOCUMENTS 3,646,613 A 2/1972 Matsumoto et al.
3,810,515 A 5/1974 Ingro et al.
(Continued)

FOREIGN PATENT DOCUMENTS

CH 588962 A5 6/1977
DE 8701763 U1 5/1987
(Continued)

OTHER PUBLICATIONS

Baharuddin, Zafri, et al., Analysis of Line Sensor Configuration for the Advanced Line Follower Robot, Jan. 2005, 13 pages.
(Continued)

*Primary Examiner* — James R Bidwell
(74) *Attorney, Agent, or Firm* — Miller Nash LLP

(57) ABSTRACT

A method for actuating transport carriers in order to transport hanging articles on an overhead conveying device for an order-picking system includes a track marking provided along a transport path. The transport carrier is moved according to a driving specification, which is stored in a memory of the transport carrier. The track marking comprises a query marking, which marks a diverter section and at which the driving specification from the electronic memory is accessed. According to the driving specification, the transport carrier can be moved straight ahead or diverted in the diverter section. The track marking further comprises a notification marking, at which a further driving specification for subsequent diverter sections is transmitted to the transport carrier. A corresponding transport carrier and an overhead conveying device are also disclosed.

34 Claims, 13 Drawing Sheets

(51) Int. Cl.
*B65G 17/48* (2006.01)
*B65G 23/23* (2006.01)
*B65G 54/02* (2006.01)

(52) U.S. Cl.
CPC ........... *B65G 17/485* (2013.01); *B65G 23/23* (2013.01); *B65G 54/02* (2013.01)

(56) References Cited

U.S. PATENT DOCUMENTS

| | | | |
|---|---|---|---|
| 5,267,173 A | 11/1993 | Tanizawa et al. | |
| 5,329,449 A | 7/1994 | Tanizawa et al. | |
| 5,396,074 A * | 3/1995 | Peck | G21K 5/10<br>250/454.11 |
| 5,768,998 A | 6/1998 | Enderlein et al. | |
| 6,109,568 A | 8/2000 | Gilbert et al. | |
| 6,886,651 B1 | 5/2005 | Slocum et al. | |
| 6,971,464 B2 | 12/2005 | Marino et al. | |
| 2006/0229803 A1 | 10/2006 | Shimamura | |
| 2012/0285760 A1 | 11/2012 | Saylor | |
| 2012/0312188 A1 | 12/2012 | Inui | |
| 2016/0039431 A1 | 2/2016 | Olson et al. | |
| 2017/0008700 A1 | 1/2017 | Wada | |
| 2017/0197795 A1 | 7/2017 | Murao | |
| 2019/0202048 A1 | 7/2019 | Tarbaieva et al. | |
| 2020/0074825 A1 | 3/2020 | Martin | |
| 2022/0048711 A1 | 2/2022 | Kriechbaum et al. | |
| 2022/0263398 A1* | 8/2022 | Yamamoto | B65G 54/02 |
| 2022/0363491 A1* | 11/2022 | Gilchrist | B65G 47/52 |
| 2023/0212021 A1* | 7/2023 | Nakajima | C04B 35/6262<br>501/152 |
| 2025/0122021 A1* | 4/2025 | Rehm | B65G 1/0457 |

FOREIGN PATENT DOCUMENTS

| | | | | |
|---|---|---|---|---|
| DE | 69104604 T2 | 11/1994 | | |
| DE | 69114945 T2 | 1/1996 | | |
| DE | 69116300 T2 | 2/1996 | | |
| DE | 4436519 A1 | 4/1996 | | |
| DE | 9018150 U1 | 10/1996 | | |
| DE | 60214761 T2 | 10/2006 | | |
| DE | 102006049754 B3 | 12/2007 | | |
| DE | 102014203239 A1 | 8/2015 | | |
| DE | 202016008366 U1 | 9/2017 | | |
| DE | 202017106993 U1 | 12/2017 | | |
| DE | 102018128417 A1 | 12/2019 | | |
| EP | 0620145 A1 | 10/1994 | | |
| EP | 1159180 A1 | 12/2001 | | |
| EP | 1777175 B1 | 1/2008 | | |
| EP | 2786940 A1 | 10/2014 | | |
| EP | 3476685 A1 | 5/2019 | | |
| FR | 2745764 A1 | 9/1997 | | |
| GB | 848490 A | 9/1960 | | |
| JP | S6035651 A | 2/1985 | | |
| JP | H10203647 A | 8/1998 | | |
| JP | 2001328530 A | 11/2001 | | |
| JP | 2012003675 A | 1/2012 | | |
| JP | 2015095158 A | 5/2015 | | |
| KR | 102238169 B1 * | 4/2021 | | H01L 21/67706 |
| WO | 2016056888 A1 | 4/2016 | | |
| WO | 2017100170 A1 | 6/2017 | | |
| WO | 2019234046 A2 | 12/2019 | | |
| WO | 2020160585 A2 | 8/2020 | | |

OTHER PUBLICATIONS

Musgrave, David, #Robotics Handling intersection shortcut markers, Aug. 6, 2019, URL: https://web.archive.org/web/20191226061944/https://winthropdc.wordpress.com/2019/08/06/robotics-handlingintersectionshortcut-markers/, 8 pages.

SSI Schaefer Group, "Automated Guided Vehicle Weasel, E-Commerce, Supply Chain, Hermes Fulfilment GmbH," online at https://www.youtube.com/watch?v=WIIS3vNSuQ4, May 27, 2016, 10 screenshots.

European Patent Office. International Search Report and Written Opinion of the International Searching Authority in Application No. PCT/AT2023/060032, mailed Jun. 15, 2023, 31 pages.

* cited by examiner

SENSOR ARRAY
30
OBSTACLE SENSOR SYSTEM
31
DRIVE 1
15
DRIVE 2
15
POWER ELECTRONICS
36
MICRO CONTROLLER
34
COMMUNICATION
37
33
ENERGY STORAGE
26
MEMORY
35
ENERGY MANAGEMENT
38
ENERGY TRANSMISSION
39

OVERHEAD CONVEYING DEVICE

RELATED APPLICATIONS

This is a national stage under 35 U.S.C. § 371 of International Application No. PCT/AT2023/060032, filed Feb. 3, 2023, which claims priority of Austrian Patent Application No. A50068/2022, filed Feb. 4, 2022, and Austrian Patent Application No. A50463/2022, filed Jun. 27, 2022.

TECHNICAL FIELD

The field of the present disclosure relates to an overhead conveying device for an order-picking system.

BACKGROUND

WO 2020/160585 A2 discloses a transport carrier system for an overhead conveying device in this context, for example. In particular, the transport carrier has a universally usable base body and a support body that can be replaced via a connecting device and that, in a first configuration, is provided with a completely enclosed receiving opening for transporting transport bags and, in a second configuration, is provided with a hook for transporting goods on clothes hangers.

A disadvantage of this and other known transport carrier systems is that these do not allow individual movement of a transport carrier by an order-picking system. Instead, transport carriers are moved collectively with other transport carriers in known order-picking systems. This leads to performance losses in the operation of known order-picking systems and to means that known order-picking systems require a comparatively large amount of installation space. Furthermore, the support structure in known order-picking systems cannot be configured very flexibly.

Furthermore, WO 2019/234046 A2 describes a transport carrier system for an overhead conveying device, wherein the transport carriers have a drive device and can thus be moved autonomously along a rail system. Only a destination need be specified once for this purpose. The track is then determined autonomously by the transport carrier.

SUMMARY

Disclosed herein is an improved overhead conveying device.

In some embodiments, an overhead conveying device for an order-picking system comprises a support structure that forms a driving surface. The overhead conveying device further comprises a transport carrier for transporting hanging articles, the former forming a base body, wherein the base body forms a first transport carrier side and a second transport carrier side, and a drive device for moving the transport carrier along the driving surface. The transport carrier additionally has a holding force generator, by means of which the transport carrier movably held to the support structure, in particular on the driving surface. This means that the holding force acts substantially in the direction orthogonal to the driving surface and allows movement of the transport carrier on the driving surface.

The proposed measures may lead to a particularly flexible configuration of the support structure, since it only has to provide one driving surface for the transport carriers.

The proposed measures can further lead to individual selection of a route of the transport carrier, a speed of the transport carrier, an acceleration of the transport carrier and/or a distance of the transport carrier to another transport carrier moving ahead. By accordingly specifying the speed of the transport carrier and/or the distance of the transport carrier to another transport carrier moving ahead, a specific throughput of transport carriers can also be specified or achieved. Said speed and said distance can be increased in curves and reduced in straight sections, for example. Said throughput can thereby be kept particularly constant. In particular, it is also possible to individually regulate a pendulum movement of the hanging articles, which can occur during acceleration or braking of the transport carrier. In this case, drive wheels of the transport carrier are driven such that these counteract a pendulum movement. Control algorithms for this purpose are known in principle and are therefore not described in detail here.

The hanging articles can generally be formed by items of clothing that hang on the transport carriers by means of hangers, or by transport bags for receiving articles that hang on the transport carriers.

It is advantageous for the overhead conveying device or the transport carrier(s) to comprise the hanging article, which can be transported with the transport carrier, and for the hanging article to optionally have a transport bag with a bag body for storing an article.

In particular, the transport bag and the transport carrier are coupled to one another. In a preferred embodiment, the transport bag comprises a hanging carrier, the hanging carrier and the transport carrier being coupled to one another in an articulated manner by an articulated connection such that the hanging carrier is pivotable relative to the transport carrier about an axis extending essentially in parallel to the overhead conveying device (or essentially orthogonal to the transport direction of the transport carrier). The transport carrier can be provided with a first coupling element and the hanging carrier with a second coupling element, wherein the first coupling element and the second coupling element can be coupled and form the articulated connection. The first coupling element can comprise a pivot mount and the second coupling element can comprise a pivot bearing axis. The pivot bearing axis can be formed on a hook. According to another embodiment, the articulated connection between the hanging carrier and the transport carrier can comprise an elastic body, in particular made of elastomer material, which is connected on the one hand to the hanging carrier and on the other hand to the transport carrier. The hanging carrier and the transport carrier are preferably permanently or non-detachably connected to one another via the elastic body (the elastic articulated connection).

It may be advantageous to perform the following steps in accordance with a method for actuating transport carriers to transport hanging articles on an overhead conveying device for an order-picking system:

- providing a track marking along a transport path, comprising a notification marking and an query marking, which is assigned to a diverter section of the transport path, wherein the diverter section comprises an infeed route leading to a node of the diverter section and a plurality of outfeed routes leading away from the node, and the infeed route and a respective outfeed route each form a path for the transport carrier in the diverter section, wherein the query marking is arranged along the infeed route,
- providing a driving specification in a memory of a transport carrier, which comprises a path definition that specifies a path of the paths for the transport carrier in the diverter section, moving the transport carrier along the transport path by a driving control of the transport carrier, passing the diverter section through the transport carrier, comprising the steps:

accessing the path definition from the electronic memory when the transport carrier reaches the query marking by the driving control, selecting the path in the diverter section according to the path definition by the driving control, actuating the transport carrier by the driving control such that the former is moved along the selected path in the diverter section, transmitting a further driving specification from a superordinate controller to the transport carrier when the latter reaches the notification marking, wherein the further driving specification is provided in the memory of the transport carrier.

The track marking is provided along the transport path. The track marking is preferably arranged on the support structure, in particular on the driving surface. The track marking further comprises at least the query marking and the notification marking. As described below, the track marking can also comprise further markings.

The query marking marks a location, for example a turn-off point, along the transport path, which is located upstream of the node of the diverter section in a transport direction of the transport carrier. Furthermore, the query marking influences a behavior of the transport carrier. Specifically, the transport carrier or its driving control is prompted to access the path definition from the memory by reaching the query marking. The query marking thus essentially acts as a turn-off point. The query marking is arranged along the infeed route of the diverter section for this purpose.

Furthermore, the notification marking marks a location or notification point along the transport path at which a transmission of a new or the further driving specification is possible and, if necessary, required. The notification marking is preferably assigned to a merging section described below, at which a plurality of routes of the transport path merge in one route.

Provision can be made for the track marking to comprise a driving marking, with which the transport carrier can be guided along the transport path. The driving marking is preferably followed by the transport carrier when the latter moves. For this purpose, it is particularly advantageous for the driving marking to be detected by the transport carrier, in particular by the detecting unit of the transport carrier, and the transport carrier to be actuated by the driving control such that the transport carrier is moved along the driving marking.

The driving marking is preferably formed as a movement line extending along the transport path with a first edge and a second edge. When the transport carrier moves, the first edge or the second edge, in particular optionally, is followed by the transport carrier. The (optical) driving marking can thus be configured as a guide line or movement line on the driving surface of the support structure, along which the transport carrier is to move. To form the transport path fork in the diverter section, the movement line fork can be star or Y-shaped, for example, in order to mark the infeed route and the outfeed routes.

Furthermore, provision can be made for the driving marking to comprise a, in particular a first, switch marking, wherein the transport carrier is actuated by the driving control in reaction to reaching said switch marking such that the first edge of the driving marking is followed by the transport carrier, and/or to comprise a, in particular second, switch marking, wherein the transport carrier is actuated by the driving control in reaction to reaching said switch marking such that the second edge of the driving marking is followed by the transport carrier. Thus, the first or second edge can optionally be followed, regardless of whether the transport carrier has followed the first or second edge when reaching the respective switch marking. As a result, a forced guidance can be achieved when the transport carrier is not permitted to move on a route, for example.

By analogy, in the case of a transport carrier, provision can be made for the driving control to be configured to follow a first guide specification of a driving marking in response to a detection of a switch marking of a first type, for example of the first switch marking, and to follow a second guide specification of a driving marking in response to a detection of a switch marking of a second type, for example of the second switch marking. The first and second guide specifications can be formed or provided in particular by the first and second edges of the movement line.

Furthermore, it can be provided that the track marking comprises a regulation marking, with which movement dynamics of the transport carrier, in particular a speed, an acceleration profile and/or a distance from a transport carrier moving ahead, can be influenced.

The regulation marking can act as a stopping point when the marking causes the transport carrier to stop, for example. A change in the speed of the transport carrier, the change in the acceleration of the transport carrier and/or the change in the distance of the transport carrier to another transport carrier, in particular moving ahead, can also be influenced by a regulation marking.

The query marking, the notification marking, the regulation marking, the verification marking and the like can be substantially summarized under the term “control marking”. A control marking can therefore be a query marking, a notification marking, a regulation marking and/or a verification marking.

It is advantageous for the transport carrier to be moved in straight sections of the transport path at a higher speed than in curved sections of the transport path, for example. It can further be provided that the transport carrier is moved at a greater distance from a transport carrier moving ahead in sections of the transport path in which diverter sections or merging sections are arranged, for example. This can be achieved with a corresponding regulation marking or with a plurality of regulation markings.

Additionally, it can be provided that the track marking comprises further markings, such as a verification marking, for example.

In this case, it can be provided that reaching the verification marking triggers a notification signal to be transmitted as described below in connection with the notification marking. Thus, an arrival of the transport carrier at a defined location can be verified without necessarily transmitting a new driving specification.

For a transport carrier, it is advantageous for the driving control to be configured to trigger sending of a notification signal in reaction to detecting a verification marking.

Provision can be made for the track marking, in particular the previously described markings of the track marking, to be detected and recognized by the transport carrier, in particular by a detecting unit of the transport carrier, or for the transport carrier to be detected and identified by the track marking. In the latter case, the respective marking can be configured to signal to the driving control that it has been reached.

It is advantageous for the track marking, in particular the query marking and/or the notification marking to be able to be detected by the transport carrier, for example by a detecting unit of the transport carrier, or be detected and evaluated by the detecting unit of the transport carrier, in particular to identify the query marking and/or the notification marking. One step of detecting and evaluating the track marking preferably takes place during movement of the transport carrier along the transport path. In this way, the track marking can be configured as a substantially passive marking such that no power and/or data lines need be connected to the markings.

Provision is preferably made for the driving marking, in particular the query marking, the notification marking, the regulation marking and/or the driving marking to be selected from a group comprising an optical marking, mechanical marking, electronic marking, magnetic marking and/or electromagnetic marking.

An optical marking can be applied to the support structure, for example, painted, glued, etched, engraved, printed or the like. The optical marking can particularly be configured as a barcode or QR code. In addition, the optical marking can (in the transport direction) also be configured to be longer and act on a plurality of successive transport carriers. Although the use of optical markings is advantageous, it is of course also possible to use markings on a different basis, for example mechanical, electronic and/or magnetic markings.

A mechanical marking can be configured as a button, for example, which is actuated by the transport carrier, or as a (spring-loaded) stop, which actuates a button arranged on the transport carrier when the transport carrier reaches the respective marking.

An electronic marking can further be configured as an electrical connection device, wherein an electrical connection is established between the marking and the transport carrier when the transport carrier reaches the respective marking.

A magnetic or electromagnetic marking can be provided by a stationary electromagnet or permanent magnet, for example, wherein its magnetic field can be detected by a magnetic field sensor arranged on the transport carrier when the transport carrier reaches the respective marking. Alternatively, the magnetic field sensor can also be arranged in a stationary manner on the support structure and provide the marking. In this case, the electromagnet or permanent magnet can be arranged on the transport carrier.

In order to detect and, if necessary, identify the route marking, it can be provided that the transport carrier has a detecting unit connected to the driving control, with which a track marking, in particular a driving marking and/or control marking, arranged in particular on the support structure of the distribution module and/or the overhead conveying device, can be detected or read. A movement of the transport carrier on the support structure can be influenced by the track marking. The detecting unit can be configured as a driving surface sensor or comprise one.

It is advantageous for the detecting unit to comprise a sensor, in particular a driving surface sensor, which is selected from a group comprising optical sensors, mechanical sensors, electronic sensors and/or magnetic field sensors. It is expedient for the track marking to be configured accordingly. In this case, the track marking can influence the movement of the transport carrier. In particular, the driving surface sensor can be configured as an optical driving surface sensor and the track marking can be configured as an optical driving marking and/or the control marking can be configured as an optical control marking. In other words, the behavior of the transport carrier in this embodiment is influenced by markings on the support structure.

In order to selectively detect different regions, for example two edges of the movement line, independently of one another, it is preferably provided that the sensor comprises a first sensor unit and a second sensor unit, which can be activated and/or read alternately.

It can therefore be provided that the driving marking is configured as a movement line extending along the transport path with a first edge and a second edge, and the transport carrier has a detecting unit connected to the driving control, which comprises a sensor with a first sensor unit and a second sensor unit, wherein the first sensor unit is configured to detect the first edge of the driving marking and the second sensor unit is configured to detect the second edge of the driving marking.

It is advantageous for the transport carrier, in particular the detecting unit of the transport carrier, to have a first sensor unit for detecting the first edge and a second sensor unit for detecting the second edge, wherein the first sensor unit is optionally activated and/or read by the driving control to follow the first edge, or the second sensor unit is activated and/or read to follow the second edge. In this case only the first or second sensor unit can optionally be activated, so that no signal is output by the respective other sensor unit, for example. Alternatively, both sensor units can be activated but signals can optionally only be read by one of the sensor units, depending on which edge is to be tracked, for example.

In this case, it can also be provided that the detecting unit comprises a surface sensor, for example a photo sensor or a camera, with which the movement line can be detected. The first and second sensor unit can be formed by a first pixel group, with which the first edge is detected, and a second pixel group, with which the second edge is detected.

The driving specification and/or the further driving specification are provided in the memory of the transport carrier. This can take place by transmitting the (further) driving specification from the superordinate controller, in particular by means of the communication unit, to the transport carrier or its driving control and storing it in the memory. The memory is preferably configured as a writeable and readable (electronic) memory.

On the one hand, the driving specification, in particular a first driving specification, can be transmitted from the superordinate controller, in particular by a communication unit of the superordinate controller, to the transport carrier at a starting point of the transport carrier, for example in a warehouse for hanging articles, at a loading station or the like, in order to provide the driving specification. The further driving specification or further driving specifications can also be transmitted to the transport carrier at one or more notification markings from the superordinate controller in particular by a communication unit of the superordinate controller as described below.

It is favorable for the further driving specification to also include a path definition.

In addition, the driving specification and/or the further driving specification can comprise a release instruction.

The transport path forks at a node in the diverter section. For this purpose, the diverter section comprises the infeed route leading to the node, via which the transport carrier is moved to the node, and a plurality of outfeed routes, in particular two, leading away, via which the transport carrier is moved away from the node. A plurality of such diverter sections can be provided along the transport path as described below.

It is advantageous for the driving marking to comprise a driving marking of the diverter section, wherein a first edge of the driving marking extends along the infeed route and further along a first outfeed route, and a second edge of the driving marking extends along the infeed route and further along a second outfeed route. In this case, the edges extend such that the first edge defines a first path and the second edge a second path in the diverter section. When the driving control actuates the transport carrier, the transport carrier is actuated such that the first edge is followed when the first path is selected or the second edge is followed when the second path is selected.

The path definition specifies a path for the transport carrier at least in a diverter section of the transport path or the support structure and thus essentially forms a decision basis for the driving control as to which path is to be selected or traveled in the (next) diverter section or in the next diverter sections. Essentially, the path definition indicates that outfeed route along which the transport carrier is to be moved away from the node.

The path definition can, for example, comprise the selection of a specific driving marking in a diverter section, i.e. the sequence "straight-ahead movement, diversion movement, diversion movement, straight-ahead movement", for example. As mentioned, this path definition is transmitted to the driving control, stored in the memory, and is then used for the autonomous selection of a driving marking or the autonomous switching of the switches. That is to say, in the first diverter section, that driving marking is selected that effects straight-ahead movement, in the second diverter section, that driving marking that effects diversion movement, and so on. The transmission of the path definition, however, can take place in optical, radio-based or wired fashion.

If there are two outfeed routes and thus two selectable paths in the diverter section, the path definition can be specified in binary form, for example, wherein "O" indicates a first path or a first outfeed route and "1" defines a second path or a second outfeed route. Thus, a bit can be assigned to each diverter section predefined by the driving specification, for example. Figuratively speaking, "0" or "1" can mean "left" and "right", for example.

The path definition generally comprises a selection specification or a bit for each diverter section between that location at which the transport carrier receives the driving specification, for example the starting location or the notification marking, and the next notification marking, a destination and/or a previously described verification marking. Thus, the path definition essentially describes the path to be covered by the transport carrier, for example up to the notification marking, at which the transport carrier receives the further driving specification.

In order to realize a complex transport system, it can thus be advantageous for the track marking along the transport path to comprise a plurality of query markings, each of which is assigned to a diverter section of the transport path. In this case, the diverter sections each comprise an infeed route leading to a node of the respective diverter section and a plurality of outfeed routes leading away from the node. The infeed route and a respective outfeed route each forms a path for the transport carrier in the respective diverter section, wherein the respective query marking is arranged along the infeed route. In this case, the path definition can comprise a list of a plurality of list elements, wherein list elements each specify a path of the paths for the transport carrier in one of the diverter sections. Furthermore, a plurality of, in particular successive, diverter sections are passed by the transport carrier. A path of the paths is selected in each case according to one of the list elements. For the sake of expediency, the selection of the outfeed route for successive diverter sections takes place in accordance with successive list elements.

Such a list with four list elements, for example, can comprise the list elements "left, right, right, left" or "0, 1, 1, 0" as described above "straight-ahead movement, diversion movement, diversion movement, straight-ahead movement". Fork lines to be selected for the next four diverter sections are specified for this purpose. In this example, the transport carrier would select the first or left-hand route, the second or right-hand route, the second or right-hand route again and finally the first or left-hand route in succession in a first, second, third and fourth diverter section. Of course, the list can include any number of list elements, though short lists require more frequent transmissions of new route definitions or driving specifications, these also allow greater flexibility of the system.

It is expedient for an ordinal number to be assigned to each of the list elements and for a marking counter to be incremented by the driving control when the query marking is reached (by the transport carrier) when passing the (respective) diverter section or sections. In this case, the outfeed route can be selected according to that list element whose ordinal number corresponds to the marking counter. Thus, the driving control can essentially count how many diverter sections have been passed and the corresponding list element can be observed. When incrementing, the marking counter increases by one. Thus, when the transport carrier reaches the first diverter section and thus the first query marking, the marking counter is increased from zero to one. The selection of the path in the diverter section thus takes place according to the first list element. In the i-th diverter section, the marking counter is increased from $i-1$ to $i$ in the same way. The path is thus selected according to the i-th list element. The marking counter can be embodied as a counting variable implemented in the driving control, for example.

Alternatively, the first list element can be used to select the path and then deleted after selecting the path. Thus, the next list element becomes the "first list element", which is used in the next diverter section for the selection of the path. No marking counter is required for this purpose.

When selecting the paths has taken place for all list elements of the path definition, it can be expedient for the marking counter to be set to zero by the driving control. By doing so, the list elements of a path definition of a further driving specification, which is transmitted to the transport carrier at the notification marking, can in turn be assigned ascending ordinal numbers starting from one. Thus, the driving specification transmitted at the notification marking is independent of how many diverter sections the transport carrier has passed on the way to the notification marking. In addition, the same driving specification or path definition could also be cycled through again, which can be useful in a circuit, for example.

It is expedient for the driving control of the transport carrier to be configured to access the driving specification from the electronic memory in response to a detection of a query marking, and to select an outfeed route of that diverter section, which is assigned to the detected query marking according to the driving specification, in particular according to the path definition.

When the transport carrier is moved along the transport path, it may reach a diverter section. When passing the diverter section, the transport carrier is moved essentially along the transport path via the infeed route and one of the outfeed routes. A selection as to via which of the outfeed routes the transport carrier is moved is performed by the driving control according to the path definition.

It is favorable for the transport path to have a merging section with a node, a first infeed route leading to the node, a second infeed route leading to the node and an outfeed route leading away from the node. In this case, when the transport carrier is moved via one of the infeed routes, the transport carrier can be guided to the node, transferred to the outfeed route and guided away from the node via the outfeed route. As a result, a plurality of routes can be merged and, for example, transport carriers can be guided from different starting points or notification markings to a common destination.

In the merging section, the first infeed route and the outfeed route preferably provide a first path for the transport carrier, in particular for a transport carrier that is moved to the node via the first infeed route, and the second infeed route and the outfeed route provide a second path for the transport carrier, in particular for a transport carrier that is moved to the node via the first infeed route.

When a driving marking and a merging section are provided, it is advantageous for the driving marking to comprise a driving marking of the merging section, wherein a first edge of the driving marking of the merging section extends along the first infeed route and further along the outfeed route and a second edge of the driving marking of the diverter section extends along the second infeed route and further along the outfeed route. In this case, the transport carrier can be actuated by the driving control such that the first edge is followed when the transport carrier is guided to the node via the first infeed route and transferred to the outfeed route, and the second edge is followed when the transport carrier is guided to the node via the second infeed route and transferred to the outfeed route. The driving marking of the merging section can, in particular, be Y-shaped.

In this case, provision can be made for a first switch marking to be arranged along the first infeed route, for example, such that the transport carrier necessarily follows the first edge. This can ensure in a simple manner that the transport carrier does not follow the second edge, for example, due to a previously actuated setting, and is misdirected in this way to the second infeed route. In the same way, a second switch marking can be arranged along the second infeed route such that the transport carrier necessarily follows the second edge.

Alternatively, it can be provided that an acute angle is formed between each adjacent infeed route and/or an obtuse angle is formed between each infeed route and outfeed route. In this case, a provision can be implemented in the driving control that, in particular in the merging section, an edge that leads to an acute angle must not be followed.

It is also conceivable for edge following to be briefly interrupted in the (immediate) region of the node of the merging section and for the transport carrier to be moved straight ahead. Edge following can be resumed immediately after the node. This can also ensure that the transport carrier does not turn off onto an infeed route.

It can be expedient for the transport path to have a connecting route that connects one of the outfeed routes of the diverter section to one of the infeed routes of the merging section. In the same way, a connecting route can also be provided that connects the outfeed route of the merging section to the infeed route of the diverter section or of another diverter section.

Various devices, in particular a loading device for loading hanging bags transported on transport carriers, an unloading device for unloading such hanging bags, a sorting device for sorting the transport carriers, buffer devices for buffering transport carriers and/or the like, can be arranged along the connecting route.

It is expedient for the notification marking to be assigned to the merging section and arranged along its first infeed route.

In order to ensure reliable transmission of the further driving specification and/or in order to avoid a collision in the merging section, for example, it can be advantageous for the transport carrier to be stopped by the driving control when the former reaches the notification marking.

It is possible for a transport carrier to be moved in the merger section the direction of the node both along the first and along a further infeed route. Thus, coordinating the transport carriers can be expedient here in particular.

This can be achieved in particular by the notification marking being assigned to the merging section and arranged along the first infeed route of the merging section, the transport carrier being moved to the notification marking when the transport carrier is moved via the first infeed route and the further driving specification comprising a release instruction indicating when the transport carrier is to be moved from the notification marking to the node and transferred onto the outfeed route, and the method comprising the following step:

actuation of the transport carrier by the driving control according to the further driving specification such that the transport carrier is moved from the first infeed route to the outfeed route according to the release instruction.

The release instruction can trigger the transport carrier to start or continue moving, for example. For this purpose, a waiting period in particular can be specified, during which the transport carrier should remain at the notification marking or at the starting location, for example, until the former departs. If the transport carrier is to immediately start or continue moving, this waiting period can be zero.

It is favorable for the release instruction to be determined by the superordinate controller such that the transport carrier is moved onto the outfeed route without colliding with another transport carrier.

In order to sort hanging articles, it can particularly be provided that the release instruction is defined by the guiding system such that the transport carrier is queued on the outfeed route behind a further transport carrier, which is moved from the second infeed route of the infeed routes to the outfeed route.

Coordinating the transport carriers can further be achieved in that the driving control is configured to communicate with a driving control of another transport carrier. It is preferably provided that the notification marking is assigned to the merging section and is arranged along the first inlet section of the merging section, the transport carrier being moved to the notification marking when the transport carrier is moved via the first infeed route, the driving control being configured to communicate with other transport carriers, and the method comprising the following steps:

sending a stop signal by a driving control of another transport carrier when the other transport carrier is in the merging section, actuating the transport carrier by the driving control such that the former is stopped along the first infeed route when a stop signal is received, actuating the transport carrier by the driving control such that the former is moved from the first infeed route to the outfeed route when no stop signal is received.

In this case, the stop signal can be sent by the transport carrier and/or the other transport carrier while passing through the merging section.

Alternatively, the method can comprise a step of sending a request signal by the driving control of the transport carrier when the latter has received the further driving specification. The stop signal can be sent by the driving control of the other transport carrier in response to receiving the request signal.

It is advantageous for the driving control to be configured to send and receive a request signal and/or to send and receive a stop signal.

It can further be provided that the transport carrier has a sensor system connected to the driving control (for signal and/or data transmission) for detecting another transport carrier, in particular in the merging section. The sensor system can be provided by distance sensors described below or can be configured analogously to these.

It is advantageous for the notification marking to be assigned to the merging section and arranged along the first infeed route of the merging section, the transport carrier being moved to the notification marking when the transport carrier is moved via the first infeed route, the driving control being connected to a sensor system to detect another transport carrier in the merging section and the method comprising the following steps:

actuating the transport carrier by the driving control such that the former is stopped along the first infeed route when another transport carrier is detected by the sensor system in the diverter section, actuating the transport carrier by the driving control such that the former is moved from the first infeed route to the outfeed route when no other transport carrier in the diverter section is detected by the sensor system.

In order to ensure transport flow in the merging section, it can be provided that an individual priority regulation or a general priority regulation is implemented for each merging section.

It can also be provided that each transport carrier is assigned a transport order with a defined priority. A priority arrangement can, for example, be such that that transport carrier with a transport order with a higher priority is given right of way in the merging section. In this case, it can be provided that the priority of the respectively assigned transport order is transmitted from one of the transport carriers to the other or from both transport carriers to the respective other. Sending the stop signal can then also be performed by that transport carrier to which the transport carrier with higher priority is assigned. Alternatively, it can also be provided that the transport carrier with low priority stops automatically. In this case, sending the stop signal is not necessary.

In order to transmit the further driving specification, it is advantageous for the superordinate controller, in particular the communication unit of the superordinate controller, to be configured for wired or wireless, in particular optical or radio-based, communication. For example, data and commands can be sent from the superordinate controller of the overhead conveying device or the order-picking system to the transport carrier or vice versa. For wired communication, power-line communication technology in particular comes into consideration, specifically by using an energy supply system of the overhead conveying device for data transmission.

It is advantageous for the method to additionally comprise the following step:

transmitting a notification signal from the transport carrier to the superordinate controller when the transport carrier reaches the notification marking, wherein the notification signal is sent by the driving control of the transport carrier and received by the superordinate controller, wherein the transmission of the further driving specification takes place in response to reception of the notification signal by the superordinate controller.

Doing so enables communication of the notification marking being reached to the superordinate controller and thus the further driving specification being transmitted at an optimal time.

In order to intervene in a corrective manner in the transport of hanging articles by the transport carrier, for example because an order structure has changed, it can be provided that the driving specification comprises a desired identifier of the notification marking, to which the transport carrier is directed in accordance with the path definition, wherein, when the notification signal is sent, the desired identifier of the notification marking is additionally sent from the driving control of the transport carrier to the controller, and when the notification signal is received, the desired identifier of the notification marking is additionally received by the superordinate controller and compared with an actual identifier of that notification marking at which the desired identifier was sent. In this case, the method can comprise a step of generating the further driving specification, the further driving specification comprising a corrective path definition when the desired identifier deviates from the actual identifier. This further driving specification can then be transmitted to the transport carrier.

When the transport carrier reaches the notification marking, a new driving specification or the further driving specification is transmitted to the transport carrier by the superordinate controller. This can be performed by a communication unit of the superordinate controller arranged in the region of the notification marking.

It is favorable for the further driving specification to be transmitted by the superordinate controller, in particular by a communication unit of the superordinate controller, during transmission and provision of the further driving specification in a transmission step. The further driving specification can be received in a subsequent reception step by the driving control of the transport carrier and then stored or provided in a storage step in the memory of the transport carrier.

In order to confirm receipt of the further driving specification, it can be provided that the transmission of the further driving specification further comprises the following step:

sending a reception signal to the superordinate controller by the driving control of the transport carrier when the further driving specification has been received by the driving control.

To move the transport carrier, it is preferably configured to be self-driven. Thus, the transport carrier is preferably moved by the driving control of the transport carrier actuating one or more drive devices of the transport carrier such that the latter is moved along the transport path.

In order to move the transport carrier in a self-driven manner, it is preferably provided that this comprises a drive device, which is designed to convert a provided, in particular electrical, drive energy into a kinetic energy for transporting the hanging articles. In order to drive wheels arranged on opposite sides differently such that the transport carrier can follow a curved trajectory, for example, it is preferably provided that the transport carrier comprises two drive devices, as will be described in more detail below.

Furthermore, the transport carrier can have a base body, wherein the drive device is arranged on the base body. In this case, it is favorable for the drive device arranged on the base body to be configured to move the transport carrier along a support structure, in particular on the support structure, of an overhead conveying device.

The transport carrier can further have a plurality of wheels rotatably mounted on the base body.

As described in detail below, the drive device preferably has an electrically powered motor, which is mounted on the transport carrier, wherein one wheel of the specified wheels is configured as a (first) drive wheel coupled to the motor.

It is favorable for the drive device to have a traction drive, via which the drive wheel is coupled to the motor (of the drive device). The drive is thus relatively quiet and low maintenance. In particular, a toothed belt or flat belt are an option as a traction means of the traction drive. Alternatively, the drive device can also comprise a transmission, gears and/or a frictional overdrive via which the drive wheel is coupled to the motor (of the drive device).

It is expedient for the driving control to be configured to send a notification signal and/or to receive a driving specification.

It is also particularly advantageous for the driving control of the transport carrier to be configured to receive a path definition from a superordinate controller, wherein the path definition specifies a path for the transport carrier at least in a diverter section, in particular of the support structure or the transport path, for storing a received path definition in the memory of the transport carrier and for selecting a path from a plurality of paths in the diverter section in accordance with the received path definition. With the help of the proposed measures, the autonomy of the transport carrier is realized in that it independently determines its path in a diverter section. The transport carrier can follow one of several driving markings for this purpose, for example. In this way, autonomous movement of the transport carrier can be realized particularly well. In this case, the superordinate controller specifies the path, which is then traveled autonomously by the transport carrier with the help of the driving control as has already been described in the context of the path definition.

It is advantageous for the driving control to be configured to influence or control a movement of the transport carrier, in particular on a support structure, on the basis of movement data stored in the (electronic) memory. In particular, a route of the transport carrier, a speed of the transport carrier, an acceleration of the transport carrier and/or a distance of the transport carrier to another transport carrier moving ahead can be influenced on the basis of the movement data. For example, the movement data can comprise a desired route of the transport carrier, a desired speed of the transport carrier, a desired acceleration of the transport carrier, and/or a desired distance of the transport carrier from another transport carrier moving ahead, and can subsequently be loaded onto the driving control, which uses the stored or deposited transport data or parameters for a movement of the transport carrier assigned thereto. Accordingly, the driving control can move the transport carrier along the stored route, set or regulate the stored desired speed of the transport carrier, set or regulate the stored desired acceleration of the transport carrier, and/or set or regulate the stored desired distance of the transport carrier from another transport carrier moving ahead. In general, the movement of the transport carrier can be influenced by control and/or regulation interventions.

In addition, it is advantageous for the driving control of the transport carrier to be configured to receive a weight of a mass to be transported by the transport carrier from a superordinate controller, to store this weight in the memory of the transport carrier, and to execute an acceleration profile as a function of this weight. The movement dynamics of the transport carrier can be adapted to the articles in this way. Said weight can originate from a database in which the weight is stored assigned to an article or can be determined by weighing. In particular, the weight of the mass carried by the transport carrier can also influence the adjustment of a pendulum movement of the hanging article, insofar as such a regulation is provided.

It is also particularly advantageous for the driving control of the transport carrier to be configured to regulate a speed of the transport carrier and/or to regulate a distance to another transport carrier. As a result, the speed and/or distance to another transport carrier can be regulated individually. The transport carriers can thus be operated or influenced in a particularly flexible manner. To regulate the distance, it can be provided that the transport carrier has at least one distance sensor, which is connected (for signal and/or data transmission) to the driving control.

It is also particularly advantageous for the transport carrier to have a plurality of distance sensors, which are connected to the driving control (for signal and/or data transmission) and are arranged such that they form an angle greater than 0° and less than 180° in pairs. As a result, the distance between transport carriers can also be well regulated in curves or in the diverter region. In each case, the signal of the distance sensor pointing into the interior of the curve is preferably or exclusively evaluated. The distance sensor can be configured as an ultrasonic sensor, for example.

It is preferably provided that the drive device comprises drive elements that abut the driving surface. In this case, the drive device can comprise an electrically operated motor arranged on the base body, wherein a first drive element of the drive elements and a second drive element of the drive elements are coupled to the electrically powered motor. Alternatively, the drive device can comprise a plurality of electrically operated motors arranged on the base body, wherein a first drive element of the drive elements is coupled to a first motor of the electrically operated motors and a second drive element of the drive elements is coupled to a second motor of the electrically operated motors.

It is also advantageous when the base body is provided with the first and second drive element, wherein the first drive element is arranged on the first transport carrier side and the second drive element is arranged on the second transport carrier side. As a result of the proposed measures, the transport carrier can move on the driving surface both straight ahead (when the drive elements are actuated identically) and around the curve (when the drive elements are actuated differently).

It is advantageous for the drive elements to each comprise one or more drive wheels. This can result in a comparatively simple structure of the drive.

The first drive element can further comprise an endlessly circulating first crawler belt or chain guided on the first transport carrier side around the drive wheels of the first drive element and/or the second drive element an endlessly circulating second crawler belt or chain guided on the second transport carrier side around the drive wheels of the second drive element. This increases the contact area towards the driving surface.

It is particularly advantageous for the first and second drive element to each form an outer circumference, and for a plurality of holding force generators to be arranged on the outer circumference of the drive elements. By doing so, a comparatively high holding force can be generated between the transport carrier and the driving surface even when the drive elements are moving. In addition, the proposed system is fault tolerant as the failure of a holding force generator does not lead to a total system failure. In this case, it is preferably provided that a plurality of holding force generators are arranged on a circumferential surface or on the outer circumference of the drive wheels or on a surface of the crawler belt or the chain.

It can alternatively or additionally be provided that holding force generator is arranged on the base body between the first transport carrier side and second transport carrier side. As a result, the holding force generator can be attached to fixed, non-moving parts of the transport carrier, meaning that the structure of the transport carrier can be simplified.

It is particularly advantageous for the holding force generator to comprise a permanent magnet, adhesive lamellae (according to the gecko principle), suction cups and/or a Velcro strip of a Velcro fastening (in particular a part of a Velcro strip), for example hooks or mushroom heads of a Velcro fastening. In the event that the holding force generator comprises a permanent magnet, it is advantageous for the support structure to form a driving surface and to be made of a ferromagnetic material (of a steel sheet, for example), wherein the transport carrier is movably held to the driving surface by (or with the help of) the permanent magnets. This means that the transport carrier then held to the driving surface due to the magnetic force. Although using one or more permanent magnets for the specified purpose is advantageous, using one or more electromagnets would also be conceivable to generate the holding force necessary for the transport carrier to held to the driving surface. It is particularly advantageous that the generation of the holding force can take place in a contactless manner. That is, the at least one permanent magnet need not be in contact with the driving surface, but can be slightly spaced therefrom. In addition to the (electro) magnetic principle, other technologies can also be used to generate a holding force, namely the specified adhesive lamellae (according to the gecko principle), suction cups and/or hooks or mushroom heads of a Velcro fastening. In this case, the holding force is generated by contact of the holding force generator with the driving surface. In this case, it is particularly advantageous for holding force generators to be arranged on the outer circumference of the drive elements. While the driving surface is configured to be quite smooth when using adhesive lamellae and/or suction cups, the former can have part of a Velcro fastening in the Velcro fastening. The other part of the Velcro fastening is then arranged on the transport carrier (in particular on the outer circumference of the drive elements). Suction cups can also be connected to a vacuum generator in order to generate or strengthen the holding force.

It is also particularly advantageous for the transport carrier to comprise a joint arrangement, which allows the hanging articles to be pivoted out relative to the base body by more than 45° and in particular by at least 90° transverse to the direction of movement of the transport carrier. This makes it possible for the transport carrier to move even on surfaces that are not horizontally aligned without movement being impeded by the hanging articles. The driving surface can extend obliquely or even be vertically aligned, then forming a wall in principle. The transport carriers held to the driving surface can also move on this wall. A space-saving storage space for the transport carriers can be formed in this way, for example. The transport carrier can have an extension rod with an eyelet arranged thereon and a hook of a hanging article rotatably mounted therein for the specified purpose. By appropriately selecting the length of the extension rod, it is possible, in particular, to influence the lateral pivoting angle.

It can alternatively be provided that, when the hanging article is coupled to the transport carrier in such a way, the hanging article is prevented from pivoting relative to the base body, in particular transverse to the direction of movement.

It is particularly advantageous for the transport carrier to have the main body and a support body with a receiving means for hanging the hanging articles. In particular, the receiving means can comprise a fully enclosed receiving opening (eyelet) for hanging a hanger of the hanging article into, or an open receiving section (hook) to hang a hanger of the hanging article into or onto.

It is advantageous if the support body is exchangeably fixed to the base body via a connecting device. The support body can thus flexibly deployable and can be used for a plurality of different hanging articles. In addition, the hanging articles can comprise a transport bag with a bag body for storing an article.

It is advantageous for the transport carrier to have an energy storage connected electrically to the motor and/or an energy source connected electrically to the motor. It can alternatively or additionally be provided that the transport carrier comprises hanging articles, which have a transport bag with a bag body for storing an article, wherein the transport bag has an energy storage electrically connected to the motor and/or an energy source electrically connected to the motor.

In particular, the motor can be connected to the energy storage or the energy source via a switch element or control element. The energy storage can, for example, be configured as a rechargeable battery or also as a capacitor (e.g., as a “supercap”). The energy storage can be charged during a movement of the transport carrier, for example via an energy supply system arranged along the support structure or along the driving surface, or in situ at a charging station of the overhead conveying device or the order-picking system.

The energy source can be configured, for example, as a solar module and be provided in addition or as an alternative to an energy storage. The proposed measures enable or support an individual movement of the transport carrier in the order-picking system. In particular, the proposed transport carrier is at least temporarily independent of a (stationary) energy supply system of the order-picking system.

It is also advantageous for the overhead conveying device to have an electric energy supply system, which comprises an insulator and exposed electrical conductors, which are arranged along the support structure or the driving surface (and are in particular arranged thereon), wherein the transport carrier has current collectors, which are in electrical contact with the electrical conductors and are electrically connected to the motor. It is thus possible to also supply a transport carrier with power independently of an optional energy storage of the transport carrier or independently of an optional energy source of the transport carrier, and to enable driving of the transport carrier. Furthermore, an energy storage of the transport carrier can also be charged via the energy supply system, in particular also during a movement of the transport carrier. The collectors can, for example, be configured as sliding contacts and slide/brush on the electrical conductors when the transport carrier moves. If the electrical conductors are arranged on the support structure and the current collectors roll off these, the current collectors can also be configured as wheels of the transport carrier.

Furthermore, it is advantageous for, along the support structure, in particular on the support structure or driving surface, the overhead conveying device to have an inductive energy supply system or an inductive energy transfer system and the energy transfer to the motor (and potentially to a charging connection of an energy storage connected to the motor) of the transport carrier to be performed via induction. The energy transfer to the transport carrier can thereby be performed contactlessly and thus noiselessly and without wear. In particular, the inductive energy supply system can have at least one electrical conductor extending parallel to the support structure or driving surface and a coil, which is arranged on the transport carrier and is electrically connected to the motor, wherein the energy transfer to the coil is performed contactlessly. In a particularly advantageous embodiment variation, the transport carrier comprises a ferromagnetic core around which the coil is wrapped and which at least partially envelops the at least one electrical conductor. The magnetic flow can thereby be guided better and the efficiency of the inductive energy transfer improved.

It is advantageous for the electrical energy supply system to be provided only on straight route sections of the driving surface. The electrical energy supply system can thereby be configured more simply. In this embodiment, on curves and diverters, the motor can be supplied from the energy storage or the energy source of the transport carrier.

It is advantageously provided that the transport carrier(s) of the overhead conveying device, the overhead conveying device and/or its support structure are configured according to one of the aspects described above. The transport carrier is preferably mounted in a moveable manner on the support structure.

Furthermore, it is favorable for the support structure to have at least one control element, and the driving control to be configured to influence or control a movement of a control element of the support structure on the basis of control data, for example on the basis of the driving specification, stored or deposited in the memory. In particular, such a control element can be understood as a device in an order-picking system that can be controlled by the driving control, for example a lift. In general, the movement of the control element can be influenced by control and/or regulation interventions.

It is favorable for the driving control of the transport carrier and/or the at least one control element of the support structure to be configured for optical, wired or radio-based communication. As already described above in the context of the communication unit, data and commands, for example, can be sent from the superordinate controller of the overhead conveying device or of the order-picking system to the transport carrier or vice versa.

The transport carrier preferably comprises a light source connected to the driving control and the control element of the support structure preferably comprises a light-sensitive element, wherein a control command can be transmitted from the driving control of the transport carrier to the control element of the support structure with the light source via the light-sensitive element. In other words, the transmission of data or control commands from the transport carrier to the support structure takes place optically. For example, it can be provided that the control element is activated or switched when the light-sensitive element receives light from the light source. This light can be modulated or unmodulated. Furthermore, more complex data transmission is possible with corresponding modulation of the light source.

It is particularly advantageous for the support structure to have a controllable light source and the transport carrier an optical driving surface sensor connected to the driving control, wherein a control command can be transmitted from the support structure to the driving control of the transport carrier by means of the light source and the optical driving surface sensor. In particular, the controllable light source on the transport carrier or the support structure can have a plurality of individually activatable luminous dots arranged in the form of a matrix. As a result, the control commands transferred to the transport carrier are not fixed, but can be flexibly adapted to a specific situation. In this case, the luminous dots can act as a track marking, in particular as a driving marking and/or control marking. The aforementioned with regard to the track marking, in particular the driving marking and/or control marking, therefore applies mutatis mutandis.

"Arranged in the form of a matrix" in this context can mean that a plurality of luminous dots are arranged in a row (in the form of a 1×m matrix) and thus form a row of luminous dots. Doing so particularly enables the creation of a one-dimensional control command. Furthermore, arranged in the form of a matrix can mean that, if appropriate, a plurality, in particular at least two, of such rows of luminous dots are arranged next to one another (in the form of an n×m matrix, wherein n>1). As a result, a multidimensional control command can be created, thereby increasing a number of controllable commands that can be created, for example.

It is advantageous for a desired speed of the transport carrier or a desired distance of the transport carrier from another transport carrier to be set on the basis of a track marking, for example on the basis of a control marking, which is arranged in the region of the support structure and can be detected by the transport carrier. As a result, the behavior of the transport carriers can be influenced simply by applying appropriate markings to the support structure. Complicated data transmission methods from a superordinate controller are not necessary for this purpose.

It is also advantageous for the transport carrier to have a driving surface sensor connected to the driving control, with which a control marking arranged on the support structure can be read, wherein a detection of the control marking triggers the driving control to notify a superordinate controller, or a short-range radio receiver to be connected to the driving control, with which a signal of a short-range radio transmitter arranged on the support structure can be received, wherein a reception of the signal by the short-range radio receiver triggers the driving control to notify a superordinate controller or has a short-range radio transmitter, wherein a reception of a signal of the short-range radio transmitter of the transport carrier by a short-range radio receiver arranged on the support structure triggers the transport carrier to notify (with the aid of the short-range radio receiver) a superordinate controller.

As already stated above, further actions can be linked to the notification, for example the transmission of commands or data from the superordinate controller to the transport carrier. For example, the (further) driving specification can be transmitted to the transport carrier, the former comprising a desired speed, a desired acceleration and/or a desired distance of the transport carrier from another transport carrier moving ahead.

The notification point can be formed by an (optical) notification marking and/or control marking. When this marking is detected by the driving surface sensor, this triggers the driving control to notify the superordinate controller, which in turn can trigger the follow-up actions already described. The notification point or the notification marking can also be formed by a short-range radio transmitter arranged on the support structure. If this marking is received by the short-range radio receiver of the transport carrier, this also triggers the driving control to notify a superordinate controller, which in turn can trigger the follow-up actions already described. Alternatively, the transport carrier can have a short-range radio transmitter. If its signal is received by the short-range radio receiver arranged on the support structure, this in turn triggers the notification to a superordinate controller, which can also trigger the follow-up actions already described. In both cases, it is advantageous for the short-range radio transmitter to transmit a unique identifier so that it can be assigned from which short-range radio transmitter a signal is received. “Short distance” in the given context means in particular a range of a few centimeters to a few meters (less than two meters, for example).

The driving control notifying the superordinate controller can preferably trigger sending or transferring of a path definition to the driving control by the superordinate controller. For example, the transport network formed by the support structure can be divided into a plurality of segments separated by control markings, in particular query markings and/or notification markings or notification points. These segments can be formed by previously described distributor modules, for example. When the driving control actively notifies at a notification point (a control marking acting as a notification point, for example), the driving control receives the path definition for the following segment from the superordinate controller. In this way, this measure supports the flexible and autonomous movement of the transport carrier through the transport network.

In a further advantageous embodiment of the overhead conveying device, the track marking, in particular the track marking and/or control marking, or the short-range radio transmitter arranged on the support structure, or the short-range radio receiver arranged on the support structure is assigned location position, wherein the notification of the driving control to the superordinate controller triggers an adjustment of the path definition starting from this position by the superordinate controller when a desired position of the transport carrier does not match the location position of the track marking, in particular the driving marking and/or control marking, or the short-range radio transmitter or the short-range radio receiver. This can be checked in particular by comparing a desired identifier, which essentially indicates the desired position with an actual identifier, which indicates the local position of the respective marking as described above. It can occur that the actual position of the transport carrier, for example, the position at which the notification signal was sent, does not match the position of the transport carrier assumed by the driving control. Selecting a path in a diverter section corresponding to the received path definition stored in the memory then leads to incorrect switching and misrouting. However, with the proposed measures, a deviation of the actual position of the transport carrier from the position of the transport carrier assumed by the driving control can be taken into account and the desired position of the transport carrier can be corrected again, i.e. set to its actual position or an alternative route can be specified.

It would also be conceivable for the track marking, in particular the driving control and/or control marking, or the short-range radio transmitter arranged on the support structure or the short-range radio receiver arranged on the support structure to be configured to trigger the simultaneous notification of the driving controls of several transport carriers to the superordinate controller. This can consequently lead to the behavior of a group of transport carriers being influenced.

It is favorable for an energy supply system of the overhead conveying device (a conductor line or an inductive energy supply system, for example), in particular the energy supply system described above, to also be configured for wired communication with the driving control of the transport carrier. This results in the energy supply system providing a double benefit.

It is also advantageous for the energy supply system of the overhead conveying device to be divided into a plurality of supply segments, which have different addresses in a communication system of the overhead conveying device. The address can particularly be detected by the transport carrier. This enables relatively simple location of a transport carrier.

It is also advantageous for the energy supply system of the overhead conveying device to be divided into a plurality of supply segments, wherein a local position is assigned to one of the supply segments of the energy supply system, and moving the transport carrier into this supply segment causes an adaptation of the path definition based on the local position, assigned to this supply segment by a superordinate controller, when a desired position of the transport carrier does not correspond with the local position of this supply segment of the energy supply system. Provision can of course be made in this case for a respective local position to be assigned to the supply segments, the adaptation of the path definition taking place depending on the respective supply segment into which the transport carrier has moved. Selecting a specific path corresponding to the path definition stored in the memory then leads to incorrect switching and misrouting in the case of the specified deviation. However, by means of the proposed measures, a deviation of the actual position of the transport carrier from the position of the transport carrier assumed by the driving control can be taken into account and the desired position of the transport carrier corrected again, i.e. set to its actual position (in this case, to the position of the supply segment into which the transport carrier moves) or an alternative route can be specified. An adapted or corrective path definition can be transferred to the transport carrier when the further driving specification is transmitted, for example.

It is particularly advantageous, in particular for the embodiment, according to which the transport carrier has a driving control and a writeable and readable memory connected thereto, for the electrical energy supply system to comprise an insulator and exposed electrical conductors, which extend along the support structure or driving surface (and are arranged on or at these in particular), and for the transport carrier to have current collectors, which are in electrical contact with the conductors and are both electrically connected to a motor of the drive device and are electrically connected to the driving control via a communication module of the transport carrier. In this way, it is possible not only to supply a transport carrier with electricity independently of an energy storage provided in the transport carrier or independently of an energy source provided in the transport carrier, but it is also possible to execute the transmission of data and/or control commands to and from the transport carrier via the electrical energy supply system in this way. A voltage applied to the electrical conductors or an electrical signal applied to the electrical conductors is also applied to the inputs of the communication module, which can extract the data from the signal and convert these. The communication module is thus also connected to the current collectors or the electrical conductors in terms of data. In particular, galvanic isolation between the current collectors and inputs of the driving control can also be executed in the communication module, for example with the aid of an optocoupler or with the aid of an isolating transformer. Of course, the communication module, the driving control and other modules can also be supplied with energy by the current collectors. The collectors can, for example, be configured as sliding contacts and slide/brush on the electrical conductors when the transport carrier moves. If the electrical conductors are arranged on the support structure and the current collectors roll off these, the current collectors can also be configured as wheels of the transport carrier.

Furthermore, it is advantageous for, along the support structure, in particular on the support structure and/or along the driving surface, in particular on the driving surface, the overhead conveying device to have an inductive energy supply system or an inductive energy transfer system and for the energy transfer to a motor of the drive device of the transport carrier and/or a data transmission to a communication module of the transport carrier connected to the driving control to be performed via induction. By doing so, the energy transfer to the transport carrier and the transmission of data and or control commands to and from the transport carrier can take place in a contactless manner. In particular, the inductive energy supply system can have at least one electrical conductor extending along the support structure or driving surface and a coil, which is arranged on the transport carrier and is electrically connected to the motor and the communication module, wherein the energy and/or data transfer to the coil is performed contactlessly. A voltage applied to the coil or an electrical signal applied to the coil is also applied to the inputs of the communication module, which can extract the data from the signal and convert these. The communication module is thus also connected to the coil or the electrical conductors in terms of data. In particular, galvanic isolation between the coil and inputs of the driving control can also be executed in the communication module, for example with the aid of an optocoupler or with the aid of an isolating transformer. Of course, the communication module, the driving control and other modules can also be supplied with energy by the coil. In a particularly advantageous embodiment variation, the transport carrier comprises a ferromagnetic core around which the coil is wrapped and which at least partially envelops the at least one electrical conductor. The magnetic flow can thereby be guided better and the efficiency of the inductive energy transfer improved.

It is preferably provided that the overhead conveying device comprises at least one distribution module having a support structure, wherein the support structure forms a driving surface and a track. The transport path is arranged along the support structure and has a diverter section with a node. Furthermore, the diverter section comprises an infeed route leading to the node and a first and second outfeed route leading away from the node. The infeed route and the first outfeed route provide a first path and the infeed route and the second outfeed route a second path for the transport carrier. The distribution module further comprises a track marking and a communication unit of a superordinate controller. In this case, the track marking is arranged along the transport path on the support structure and comprises a query marking, which can be detected in particular by the transport carrier. The query marking is assigned to the diverter section and arranged along the infeed route. The track marking further has a notification marking, which can be detected in particular by the transport carrier. The communication unit is arranged in the region of the notification marking and configured to send a driving specification. In this case, the driving specification comprises a release instruction and/or a path definition for the transport carrier. Furthermore, the driving control of the transport carrier is configured to receive a driving specification sent by the communication unit of the at least one distribution module, to store this in the memory of the transport carrier, to access this from the memory and to actuate the transport carrier according to the driving specification.

Provision is particularly preferably made for the overhead conveying device to comprise a plurality of such distribution modules and/or a plurality of such transport carriers.

The superordinate controller can comprise one or more communication units, which are each assigned to a distribution module. The communication unit of the at least one distribution module is thus preferably the communication unit or one of the communication units of the superordinate controller.

The proposed measures make it possible to move a transport carrier individually and (largely) independently of other transport carriers in the order-picking system. One possible advantage is seen in the autonomous movement of the transport carrier between a starting point and a destination, namely the location of the notification marking. In addition, it is advantageous that only a partial route and not the entire route to be covered by the transport carrier has to be specified. This enables flexible reactions to guiding errors, changes to the order structure and the like. Furthermore, communication between the transport carrier and the superordinate controller need not be ensured all along the transport path, but only at selected locations, such as in the region of the notification marking(s). The transport carrier can essentially be guided from notification marking to notification marking in this way until the destination is reached. Path corrections are possible at each notification marking, which makes the method particularly flexible.

In some embodiments, the distribution module can be used to provide sections of an overhead conveying device in which communication with the transport carrier, in particular for transmitting the further driving specification. The distribution module therefore enables modular configuration of the overhead conveying device by connecting a plurality of such distribution modules in series, for example. The distribution module is particularly configured to execute the aforementioned method.

BRIEF DESCRIPTION OF THE DRAWINGS

Each show in greatly simplified, schematic depiction.

DETAILED DESCRIPTION OF EXEMPLARY EMBODIMENTS

Figure 1:
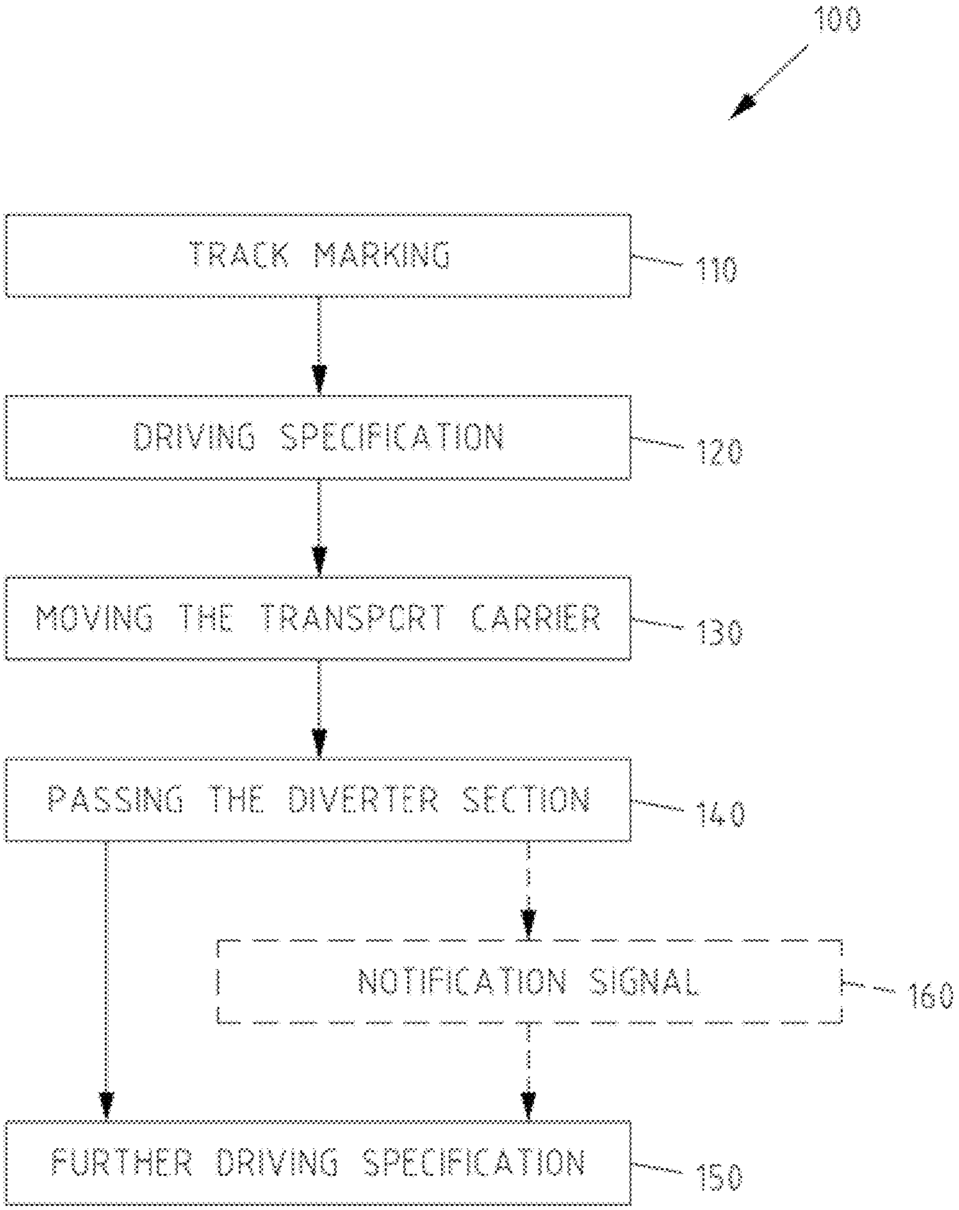
FIG. 1 a method for actuating transport carriers of an overhead conveying device, FIG. 2 passing a diverter section of the overhead conveying device by the transport carrier, FIG. 3 transmitting a further driving specification to the transport carrier, FIG. 4 a schematic representation of a detail of a transport network with a diverter, FIGS. 5*a* to 5*c* a detail of an overhead conveying device with a diverter section, FIGS. 6*a* to 6*c* a detail of the overhead conveying device with a merging section, FIG. 7 a detail of a track with a plurality of diverter sections, FIG. 8 an oblique view from above of a transport carrier with a hanging article, FIG. 9 an oblique view from below of an overhead conveying device with a driving surface and the transport carrier of FIG. 8 held thereto, FIG. 10 a detailed oblique view from above of the transport carrier of FIG. 8, FIG. 11 a detailed oblique view from below of the transport carrier of FIG. 8, FIG. 12 a detailed front view of the overhead conveying device of FIG. 9, FIG. 13 an oblique view from above of an exemplary transport carrier with crawler belts, FIG. 14 a front view of an overhead conveying device with an exemplary transport carrier and articulated connection to the hanging article, FIG. 15 an exemplary electrical block diagram of a transport carrier.

It is worth noting here that the same parts have been given the same reference numerals or same component designations in the embodiments described differently, yet the disclosures contained throughout the entire description can be applied analogously to the same parts with the same reference numerals or the same component designations. The indications of position selected in the description, such as above, below, on the side etc. also refer to the figure directly described and shown, and these indications of position can be applied in the same way to the new position should the position change.

Figure 2:
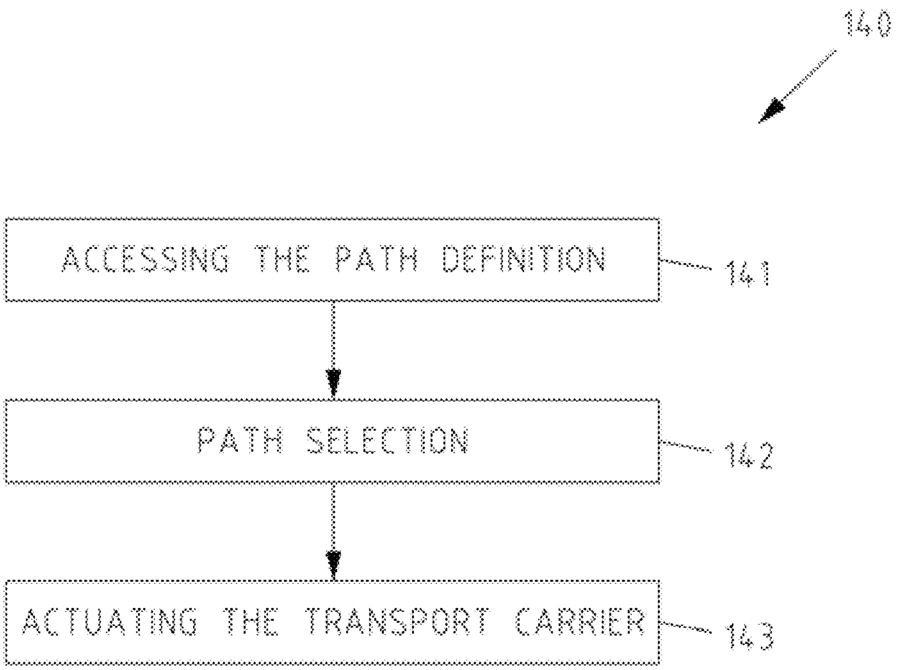
Figure 3:
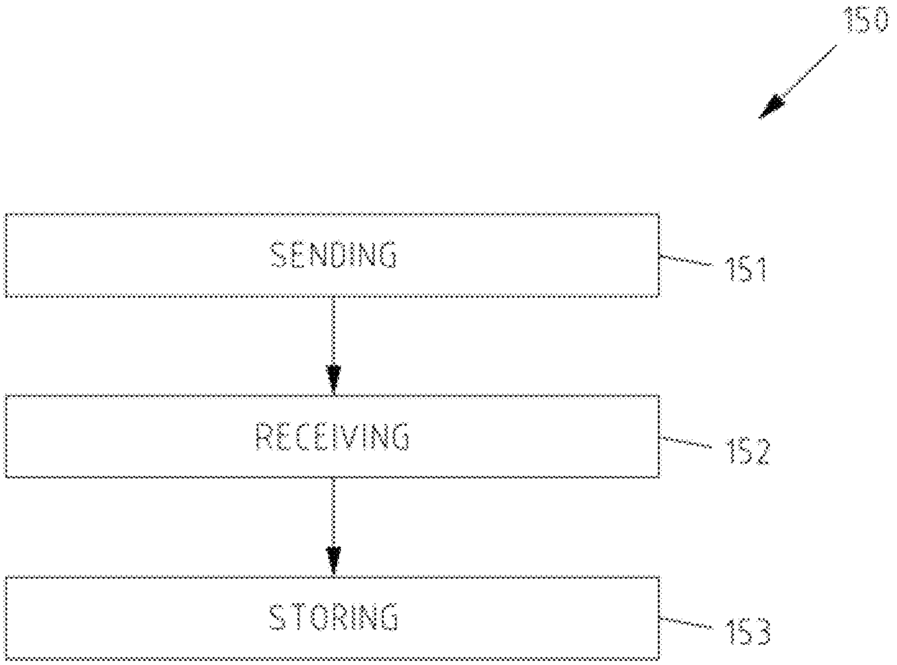

FIG. 1 to FIG. 3 schematically depict a method 100 for actuating transport carriers 3 to transport hanging articles 10 on an overhead conveying device 1 for an order-picking system.

Furthermore, FIG. 5*a* to FIG. 6*c* schematically depict a detail from below of an overhead conveying device 1, in particular a distribution module 2, with a transport carrier 3 moved along a transport path S.

In the method 100, provision 110 is firstly made of a track marking U, V1 . . . V5, which essentially serves to mark a transport path S and/or neuralgic points along the transport path S, such as forks, merges, checkpoints, and the like.

The track marking U, V1 . . . V comprises at least one query marking V1 . . . V5 and one notification marking V2, whose function is described in more detail below. The query marking V1, the notification marking V2 and the like can be substantially summarized or understood under the term control marking V1 . . . V5. In other words, a control marking V1 . . . V5 can be configured as query marking V1 or as notification marking V2, for example.

Furthermore, the track marking U, V1 . . . V5 can comprise a driving marking (U), which extends along the transport path S and guides the transport carrier 3 along the transport path S. This driving marking U can be configured as a movement line or guideline, along which the transport carrier 3 can move. The movement line comprises a first edge and a second edge.

A further provision 120 of a track specification is made for a transport carrier 3. This driving specification is stored in an (electronic) memory 35 of the transport carrier 3 and is thus accessible at any time by the transport carrier 3. For this purpose, the driving specification can, for example, be transmitted from a superordinate controller 6 to a driving control 34 of the transport carrier 3 and stored by the driving control 34 in the memory 35.

The method further comprises a step of movement 130 of the transport carrier 3 along the transport path S. This can be done autonomously by the transport carrier 3 in that it is accordingly actuated by the driving control 34. For example, the transport carrier 3 can comprise one or more drive devices 15, which are actuated by the driving control 34.

It is usually provided that the transport path S has one or more diverter sections W such that the transport carrier 3 in the order-picking system or on the overhead conveying device 1 cannot be moved along a single route alone. The diverter section(s) W comprise one or more, in particular two, paths, upon which the transport carrier 3 can move.

The track specification comprises a path definition, which indicates a path to be selected in the diverter section W or in one or more diverter sections W of the diverter sections W.

For example, the driving control 34 of the transport carrier 3 can be configured, also according to this path definition, to receive the track specification, in particular the path definition, from the superordinate controller 6, to store 35 this path definition in the memory 35 of the transport carrier 3, and to select a path of a plurality of paths in a diverter section W with the help of the driving control 34. The path definition can be transmitted with the help of optical, wired or radio-based communication (in particular via power-line communication).

The path definition can include the values or list elements "straight-ahead movement" or "diversion movement", for example. This can also be specified in binary in the form "0" or "1". "Straight-ahead movement" or "0" can mean that the transport carrier 3 should select a first path of the paths, for example. By analogy, "diversion movement" or "1" can mean that the transport carrier 3 should select a second path of the paths. If the transport carrier 3 is to pass several diverter sections W, the path definition can comprise a sequence or a list of a plurality of list elements.

The path definition can thus comprise the selection of a specific path or specific driving marking U in a diverter section W, or a sequence of a selection of a path or driving marking U for the next four diverter sections W, i.e. the sequence "straight-ahead movement, diversion movement, diversion movement, straight-ahead movement", for example. The sequence can essentially be viewed as a list comprising several list elements. This path definition is transmitted to the driving control 34, stored in the memory 35, and is then used for the autonomous selection of a specific path or specific driving marking U. In the case of a driving marking U, that driving marking U in the first diverter section W is accordingly selected that effects a straight-ahead movement, in the second diverter section W, that driving marking U that effects diversion movement, and so on. For this purpose, it can be provided that the transport carrier 3 follows the left or right edge of the driving marking U with the aid of a detecting unit or a driving surface sensor 30 and a control unit 33. By selecting the corresponding edge, the selection of the desired path in the diverter section W can be effected. The superordinate controller 6 thus specifies the path, upon which the transport carrier 3 then moves autonomously with the help of the driving control 34. The sequence can also be specified purely in binary form, for example in the sequence "0, 1, 1, 0", and can then be used directly for controlling a light source of the transport carrier 3 connected to the driving control 34.

Of course, the transmission of data from the superordinate controller 6 to the driving control 34 of the transport carrier 3 is not limited to path definitions, rather a desired speed or a desired distance to a transport carrier 3 moving ahead can also be transmitted. This can be performed additionally or alternatively to the control with the aid of control markings V1 . . . V5. The driving specification can include, for example, the desired speed and/or the desired distance for this purpose.

It is particularly advantageous for the driving control 34 of the transport carrier 3 to be configured to receive a weight of a mass to be transported by the transport carrier 3 (i.e. to receive a weight of an article, for example) from a superordinate controller 6, to store 35 this weight in the memory 35 of the transport carrier 3, and to execute an acceleration profile with the help of the driving control 34 and as a function of this weight. The movement dynamics of the transport carrier 3 can be adapted to the articles in this way. Said weight can originate from a database in which the weight is stored assigned to an article or can be determined by weighing.

When the transport carrier 3 is moved along the transport path S, it may reach a diverter section W, whereupon the transport carrier 3 passes the diverter section W. When passing 140 the diverter section W, the transport carrier 3 substantially selects and moves upon one of the possible paths according to the path definition.

In order to enable increased flexibility of transport through the transport carrier 3 by possibly diverting the transport carrier 3 or adjusting a route of the transport carrier 3, it is provided that a transmission 150 of a new or further driving specification takes place at what are known as notification points, which are marked by a notification marking V2.

As schematically illustrated in FIG. 2, passing 140 the diverter section W comprises a step of accessing 141 the path definition. This takes place in response to the transport carrier 3 reaching the query marking V1. For this purpose, it can be provided that the transport carrier 3 detects and evaluates the track marking U, V1 . . . V5 to (autonomously) detect and thus reach the query marking V1. This takes place via an interaction between the query marking V1 and the transport carrier 3, for example. The query marking V1 is configured particularly as an optical marking, which can be detected by a detecting unit of the transport carrier 3, preferably by means of light-sensitive elements 7 such as photodiodes. The query marking V1 can alternatively be configured as a scanning element, which actuates a scanner arranged on the transport carrier 3.

Subsequently, one of the paths in the diverter section W is selected 142 in accordance with the path definition by the driving control 34 and finally the transport carrier 3 is actuated 143 by the driving control 34. In this case, the transport carrier 3 is actuated such that it follows the previously selected path or is moved along this path.

Transmitting 150 the further driving specification from the superordinate controller 6 to the transport carrier 3 takes place in response to the transport carrier 3 reaching the notification marking V2. For this purpose, it can be provided that the transport carrier 3 detects and evaluates the track marking U, V1 . . . V5 to (autonomously) detect and thus reach the notification marking V2. As described in the connection with the query marking V1, this can take place via an interaction between the notification marking V2 and the transport carrier 2 for example.

The method 100 preferably comprises a step of transmitting 160 a notification signal, wherein the notification signal is sent by the driving control 34 of the transport carrier 3 and received by the superordinate controller 6. In this case, the notification signal is transmitted in response to the notification marking V2 being reached. This can be performed by a communication module 37 of the transport carrier 3, in particular a short-range radio transmitter 8. In this case, the notification signal can be received by a communication unit 5 of the superordinate controller 6, in particular by a short-range radio receiver 9. The query marking V2 can alternatively be configured as a scanner, which is actuated by a scanner element arranged on the transport carrier 3. When the transmission 160 of the notification signal is provided, it is expedient for the transmission 150 of the further driving specification to executed in response to the reception of the notification signal by the superordinate controller 6.

In a first step 151, a notification signal is preferably transferred from the transport carrier 3 to the superordinate controller 6 during the transmission 150 of the further driving specification. In this case, the notification signal is firstly sent from the driving control 34 of the transport carrier 3 when the transport carrier 3 reaches the notification marking V2.

Transmitting 150 the further driving specification preferably takes place as shown in FIG. 3 and comprises a step of sending 151 the further driving specification by the superordinate controller 6, in particular by the communication unit 5 of the superordinate controller 6. This can be performed wirelessly by a short-range radio transmitter 8 of the communication unit 5, for example. Alternatively, the sending 151 can also be wired. Sending 150 can further comprise a step of receiving 152 the further driving specification by the driving control 34 of the transport carrier 3, in particular by the communication module 37. In the case described above, the further driving specification can also be received wirelessly, for example by a short-range radio receiver 9 of the transport carrier 3, in particular of the driving control 34. Alternatively, the receiving 151 can also be wired. The further driving control 34 received is stored and therefore provided in a storing 153 step in the memory 35 of the transport carrier 3.

Regardless of how the further driving specification is transmitted 150, a previously provided driving specification can be deleted from the memory 35 when the further driving specification is transmitted.

Figure 15:
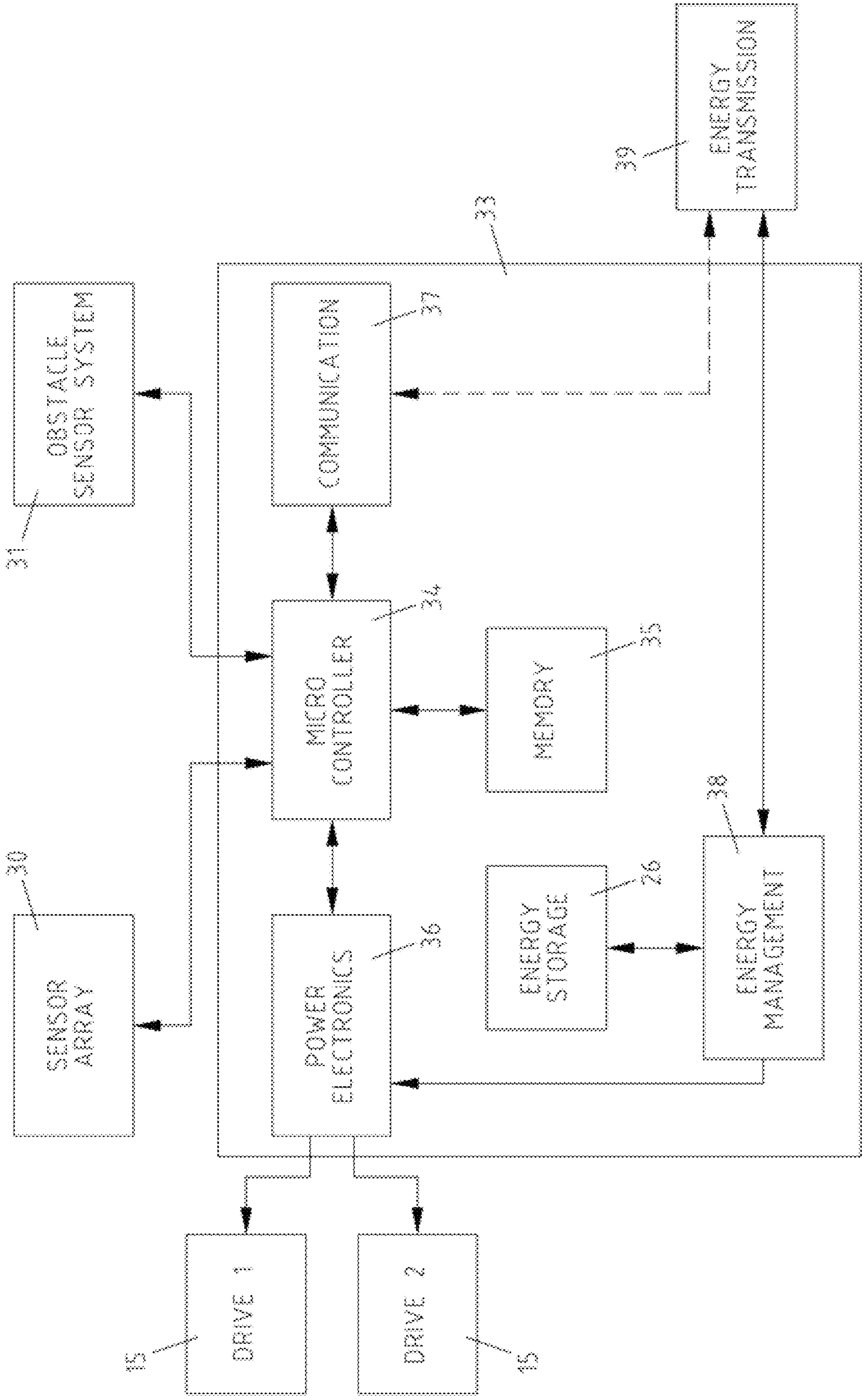

An exemplary electrical block diagram of a transport carrier 3 is shown in FIG. 15.

Figure 4:
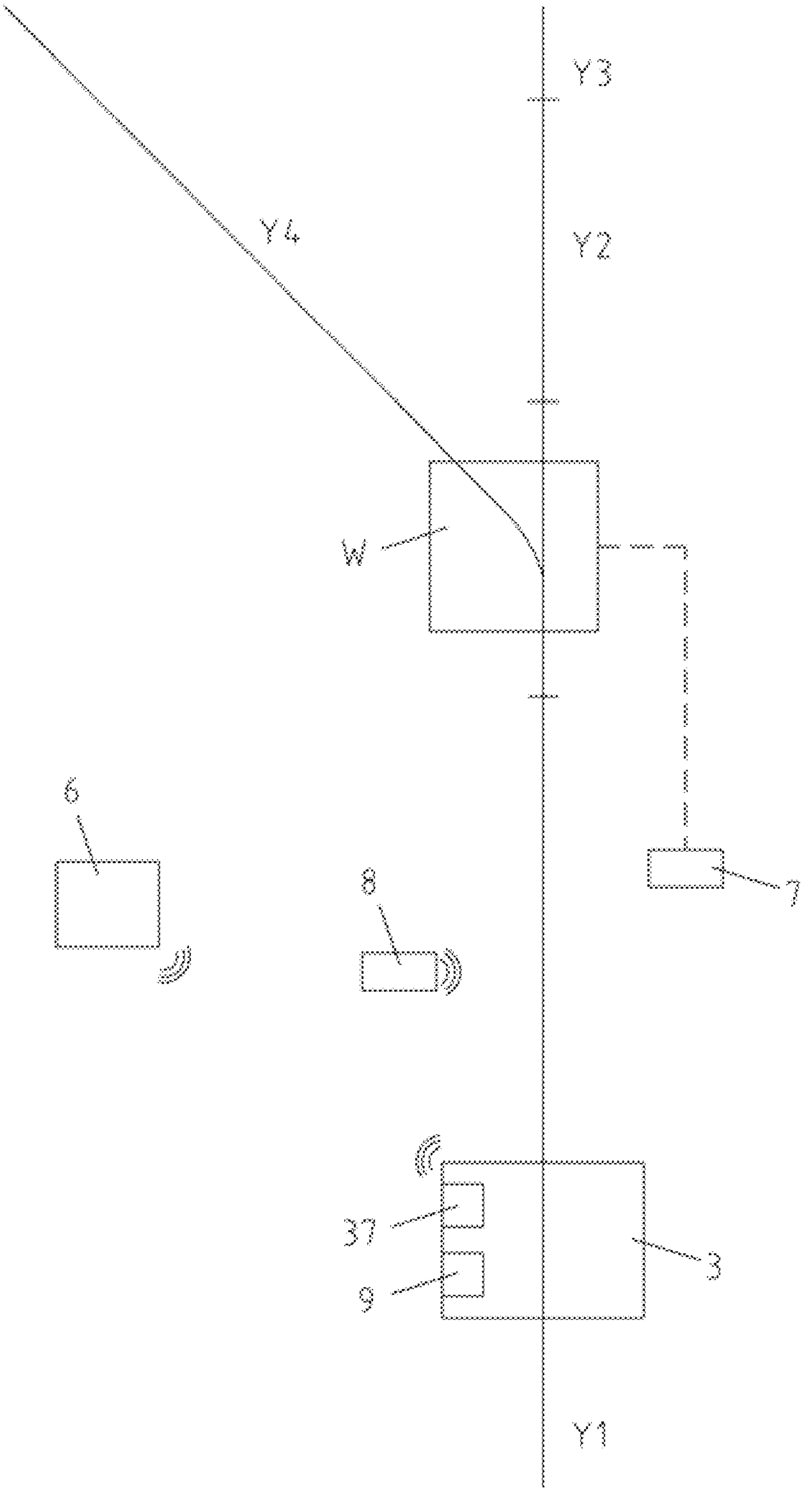

FIG. 4 additionally shows a schematic depiction of a detail of a transport network with a diverter section W, which is optionally connected to a light-sensitive element 100.

Thus, provision can be made, for example in a further embodiment, for the control marking V1 . . . V5, in particular the notification marking V2, to trigger an (active) notification of the driving control 34 to the superordinate controller 6. Reading the control marking V1 . . . V5, in particular the notification marking V2, can in turn be performed by the driving surface sensor 30 or another sensor of the transport carrier 3.

For example, the driving control 34 notifying the superordinate controller 6 can trigger sending of a path definition by the superordinate controller 6. For example, the transport network formed by the support structure 4 can be divided into a plurality of segments separated by notification points. When the driving control 34 actively notifies at a control marking V1 . . . V5 acting as a notification point, the driving control 34 receives the path definition for the following segment from the superordinate controller 6. In this way, the transport carrier 3 can be guided flexibly through the transport network (see also the supply segments Y1 . . . Y4 in FIG. 4). The control marking V1 . . . V5 acting as a notification point can also be designated as a notification marking V2.

It would also be conceivable for short-range radio transmitters 8 to be distributed in the transport network and for the transport carriers 3 to have short-range radio receivers 9 connected to the driving control 34 or vice versa, as shown schematically in FIG. 4. If a short-range radio receiver 9 detects a signal of a short-range radio transmitter 8, this can trigger the driving control 34 to notify the superordinate controller 6 and consequently also to transfer a path definition from the superordinate controller 6 to the driving control 34. If short-range radio receivers 9 are distributed in the transport network and the transport carriers 3 have short-range radio transmitters 8, the roles shown in FIG. 4 are reversed. In this case, receiving the signal of the short-range radio transmitter 8 at the stationary short-range radio receiver 9 can trigger notification of the transport carrier 3 to the superordinate controller 6 by the short-range radio receiver 9 and, as a result, also the transfer of a path definition from the superordinate controller 6 to the driving control 34

The control marking V1 . . . V5 or the short-range radio transmitter 8 (or alternatively the short-range radio receiver arranged in the transport network) can be assigned a local position, and the notification of the driving control 34 at the superordinate controller 6 can effect an adjustment of the path definition starting from the specified position by the superordinate controller 6 when a desired position of the transport carrier 3 does not correspond to the local position of the control marking V1 . . . V5 or of the short-range radio transmitter 8 (or of the short-range radio receiver). It can occur that the actual position of the transport carrier 3, which corresponds to the position of the control marking V1 . . . V5 or the short-range radio transmitter 8 (or the short-range radio receiver) when the control marking V1 . . . V5 is detected or when the signal of the short-range radio transmitter 8 is detected, does not correspond to the position of the transport carrier 3 (desired position) assumed by the driving control 34. Selecting a specific path corresponding to the path definition stored in the memory 35 may then lead to incorrect switching and misrouting. In order to check whether the desired position of the transport carrier 3 corresponds to the local position of the control marking V1 . . . V5, in particular the notification marking V2, it can be provided that the driving specification comprises a desired identifier, which indicates the desired position, and the control marking V1 . . . V5 comprises an actual identifier, which is assigned to the local position of the respective control marking V1 . . . V5 The desired and actual identifiers can be compared by the superordinate controller 6. With the proposed measures, a deviation of the actual position of the transport carrier 3 from the position of the transport carrier assumed by the driving control 34 can be taken into account or the desired position of the transport carrier 3 can be corrected again, i.e. set to its actual position. The actual position of the transport carrier 3 can be taken into account, for example, by generating a further driving specification such that it includes a corrective path definition. This further driving specification can then be transmitted to the transport carrier 3.

It would also be conceivable for the control marking V1 . . . V5 or the short-range radio transmitter 8 (or the short-range radio receiver) to be configured to effect the simultaneous notification of the driving controls 34 of several transport carriers 3 to the superordinate controller 6.

Figure 5A:
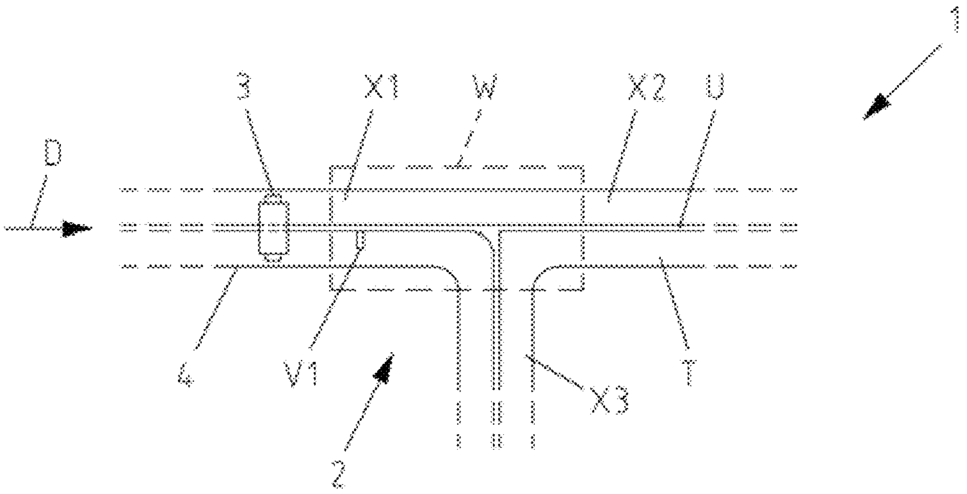
Figure 5B:
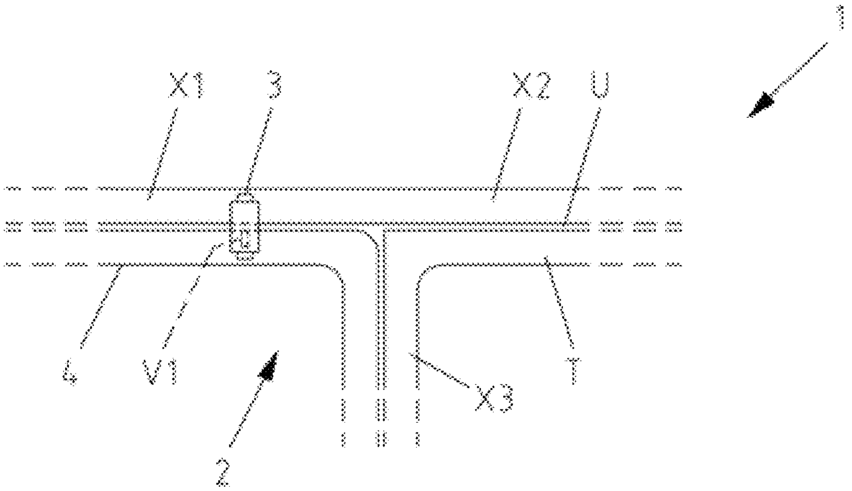
Figure 5C:
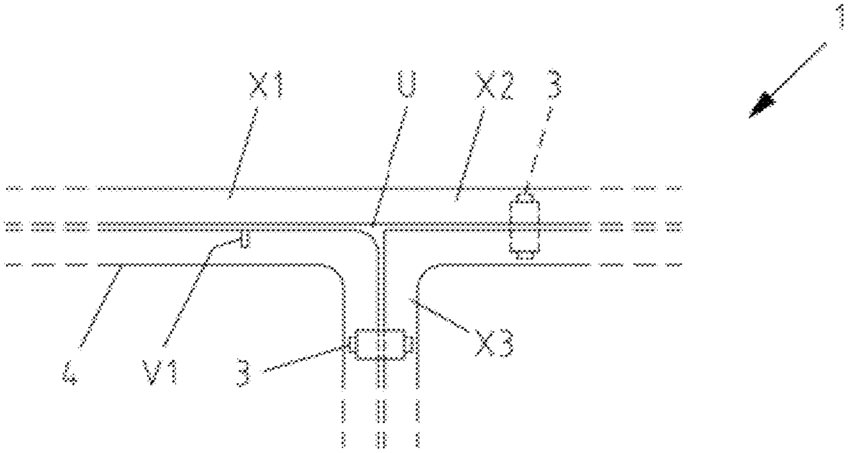

FIG. 5*a* to FIG. 5*c* schematically depict a detail from below of an overhead conveying device 1, in particular a distribution module 2, and a movement of a transport carrier 3 when passing 140 the diverter section W. For the sake of clarity, the overhead conveying device 10 is not shown.

The overhead conveying device 1 or the distribution module 2 comprises a support structure 4, which forms a driving surface T, upon which the transport carrier 3 can move. In this case the support structure 4 can be configured as a plate, for example, which the transport carrier 3 abuts such that it can roll off. The transport path S extends along the support structure 4.

The overhead conveying device 1 or the distribution module 2 further comprises a track marking U, V1 . . . V5, which is arranged along the transport path S on the support structure 4. The track marking U, V1 . . . V5 comprises one or more query markings V1 . . . V5, in particular the query marking V1 and/or the notification marking V2 described above.

The transport path S comprises the diverter section W, wherein the transport path S forks in a node of the diverter section W, such that the diverter section W has an infeed route X1 leading to the node and a plurality of, in particular two, outfeed routes X2, X3 leading away from the node. In this case, the infeed route X1 and a first or second outfeed route X2, X3 provide a first or second path for the transport carrier 3 in the diverter section W. The query marking V1 is assigned to the diverter section W and arranged along its infeed route X1.

In the diverter section W, it can be provided that the driving marking U, in particular the movement line, forks, as shown in FIG. 5*a* to FIG. 5*c*. In this case, the first edge can extend along the first path and the second edge along the second path.

In FIG. 5*a*, the transport carrier 3 approaches the diverter section W marked in dashes, where the transport carrier 3 reaches the query marking V1 as shown in FIG. 5*b*. At this time, the path definition is accessed from the memory 35, which indicates which path should be selected for at least the diverter section (W) just reached.

If, for example, the path definition indicates the first path, the transport carrier 3 is moved along the first outfeed route X2, in particular straight ahead. For this purpose, the transport carrier 3 can follow that driving marking U, which extends along the first path, for example by following the first edge of the movement line. This can correspond to the "straight-ahead movement" described above, for example.

Alternatively, if the path definition indicates the second path, the transport carrier 3 is moved further along the second outfeed route X3, as indicated in FIG. 5*c* by the transport carrier 3 marked in dashes. For this purpose, the transport carrier 3 can follow that driving marking U, which extends along the second path, for example by following the second edge of the movement line. This can correspond to the "diversion movement" described above, for example.

Figure 6A:
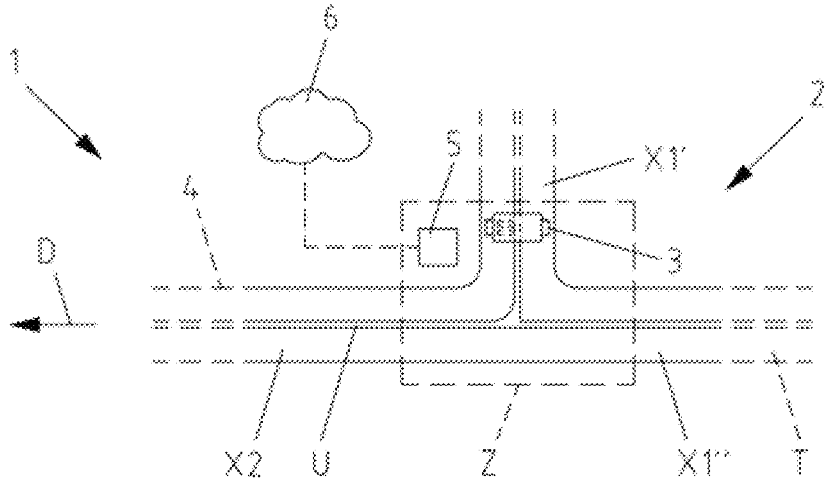
Figure 6B:
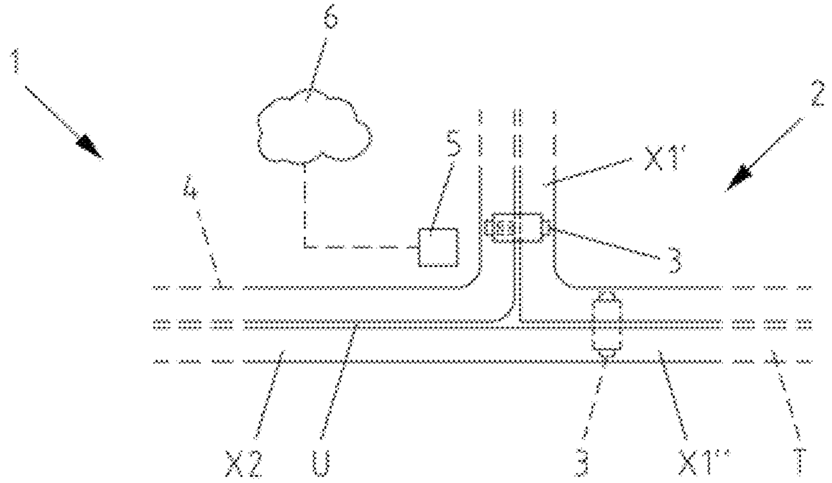
Figure 6C:
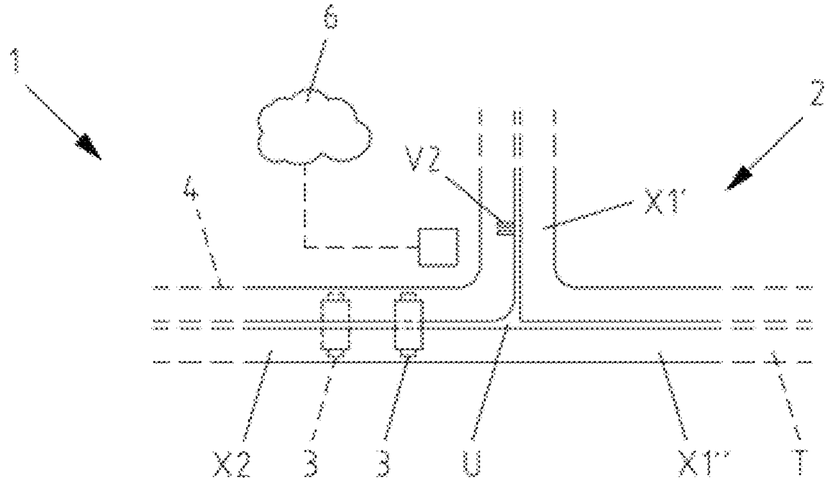

If a plurality of routes of the transport path S are to be merged into one route, it is expedient for the transport path S to comprise a merging section Z, as depicted in exemplary fashion in FIG. 6*a* to FIG. 6*c*. In this case, a plurality of routes of the transport path S merge in one route at a node such that the merging section Z has a plurality of infeed routes X1', X1", in particular two, leading to the node, and an outfeed route X2 leading away from the node. The notification marking V2 can be assigned to the merging section Z and arranged along the first infeed route X1' of the infeed routes X1', X1", as shown in FIG. 6*a* to FIG. 6*c*. Of course, a notification marking V2 can also be arranged along a second infeed route X1".

In FIG. 6*a*, the transport carrier 3 reaches the merging section W marked in dashes, where the transport carrier 3 reaches the notification marking V2 as shown in FIG. 6*b*. At this time and/or at this location, data transfer takes place between the transport carrier 3 and the superordinate controller 6. In particular the further driving specification is transmitted to the transport carrier 3 for this purpose. This can be performed as described above. If required, the further driving specification can comprise a further or new path definition.

If there are no further diverter sections W between the notification marking V2, at which the transport carrier 3 is located, and a destination to which the transport carrier 3 is to move, for example, a path definition is no longer required. In this case, the driving specification can comprise other information, for example relating to the desired speed, the desired distance, a release instruction described below, or the like. For data transfer, the distribution module 2 can comprise a communication unit 5 of the superordinate controller 6, arranged in the region of the notification marking V2.

While the transport carrier 3 is located in the merging section Z, for example at the notification marking V2, it can occur that another transport carrier 3 marked in dashes also moves along the second infeed route X1", thus reaching the merging section Z, as depicted in FIG. 6*b*.

In this case, it is expedient for the driving specification to comprise a release instruction, which indicates to the transport carrier 3 when the latter is to move via the node onto the outfeed route X2. The release instruction can be generated by the superordinate controller 6 such that this takes place without colliding with the other transport carrier 3, for example by queuing the transport carrier 3 in front of the other transport carrier 3 or after the other transport carrier 3, as shown in FIG. 6*c*.

Alternatively, it can be provided that the transport carrier 3 is equipped with a sensor system for detecting the other transport carrier 3 in the diverter section W or is configured to communicate with the other transport carrier 3 such that the transport carrier 3 can move through the node and be transferred to the outlet section X2 autonomously by the transport carrier 3 or its driving control 34, in particular without colliding with the other transport carrier 3.

In the depicted detail of the overhead conveying device 1 or in the distribution module 2, it can be provided that one of the outfeed routes X2, X3 of the diverter section W is connected to one of the inlet sections X1', X1" of the merging section Z via a connection route, as indicated by dashed lines in FIG. 5*a* to FIG. 6*c*.

Figure 7:
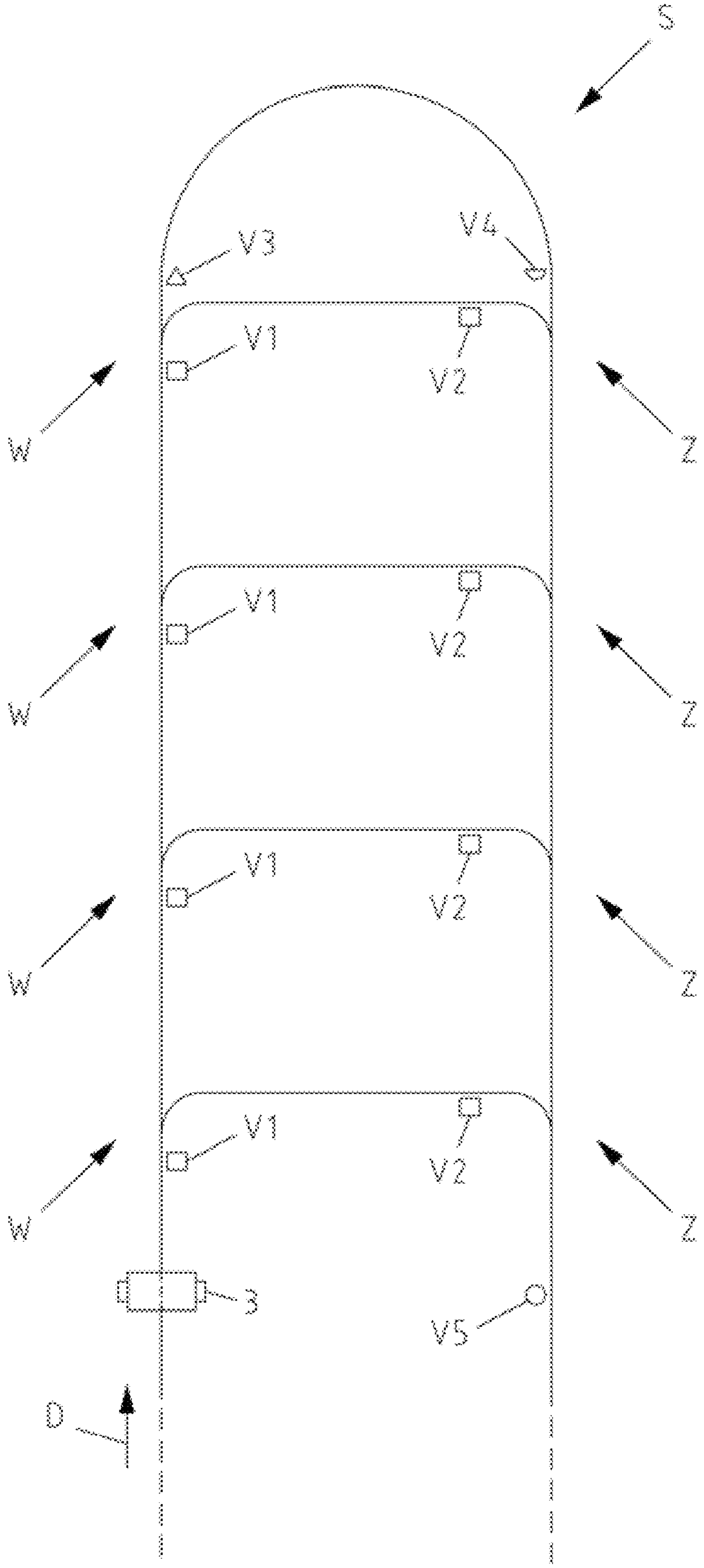

FIG. 7 schematically depicts a detail of a transport path S comprising a plurality of diverter sections W. As depicted, the transport path S can also have a plurality of merging sections Z.

As shown, a control marking V1 . . . V5, specifically a query marking V1 or a notification marking V2, can be assigned to each of the diverter sections W and/or the merging sections Z.

In addition to the control markings V1 . . . V5 already described, the track marking U, V1 . . . V5 can comprise further control markings V1 . . . V5. Such a control marking V1 . . . V5 can be a regulation marking V3, for example, which specifies a desired speed of the transport carrier 3 and/or a desired distance of the transport carrier 3. Detecting the regulation marking V3 can thus cause the transport carrier 3 or its driving control 34 to adjust the speed of the transport carrier 3 and/or a distance from a transport carrier 3 moving ahead. Such a regulation marking V3 can be arranged at any point along the transport path S depending on where a speed or distance regulation is required or desired. The control marking V3 is arranged immediately before a curve in the example shown.

Furthermore, such a control marking V1 . . . V5 can also be a switch marking V4, which specifies the edge of the movement line to follow to the transport carrier 3 or its driving specification. In the example shown, the switch marking V4 is upstream of the merging sections Z and indicates that the left line in transport direction D is to be followed. This ensures that the transport carrier 3 does not erroneously turn off in the merging section Z by accident. Straight-ahead movement is thus ensured in the example shown.

The track marking U, V1 . . . V5 can further comprise a further control marking V1 . . . V5, namely a verification marking V3. The verification marking V5 can trigger the transport carrier 3 to notify the superordinate controller 6 in the same way as the notification marking V2. By doing so, it is possible to monitor whether a transport carrier 3 or all transport carriers 3 of a transport carrier group have passed through verification point marked verification marking V5. In this case, transmitting a further driving specification is not absolutely necessary.

In the case of a plurality of diverter sections W, as shown by way of example in FIG. 7, the path definition can be used to indicate in which diverter section W the transport carrier 3 should turn off or be diverted. In order to turn off in the first diverter section W, the transport carrier 3 can have a path definition provided in its memory 35, which comprises the value or the list element "diversion movement" or "1". In the same way, if the transport carrier 3 is to turn off in the second diverter section W, the transport carrier 3 can have a path definition provided in its memory 35, which comprises the values or the list elements "straight-ahead movement, diversion movement" or "0,1". For the third or fourth diverter section W, the path definition can comprise the values or list elements "straight-ahead movement, straight-ahead movement, diversion movement" or "0, 0, 1", or "straight-ahead movement, straight-ahead movement, straight-ahead movement, diversion movement" or "0, 0, 0, 1".

A transport carrier 3 that is to turn off at the first diverter can have a path definition provided in its memory 35, which comprises the value "diversion movement" or "1"

In addition, it can be provided that the driving control 34 comprises a marking counter, which is increased or incremented by the value "1" at each diverter section W or upon detecting the query marking V1. An ordinal number can be assigned to each of the list elements described above. In the example "0, 1", the list element "0" is the first list element of the list, which corresponds to the ordinal number "1", and the list element "1" is the second list element of the list, which corresponds to the ordinal number "2". The same applies to other list elements. The outfeed route X2, X3 can then be selected according to that list element whose ordinal number corresponds to the marking counter. In the first diverter section W, the marking counter corresponds to the value "1", which is why the selection is made according to the first list element, in the second diverter section W, the marking counter corresponds to the value "2", which is why the selection is made according to the second list element, and so on.

In the example shown, the transport path S, its diverter sections W and merging sections Z, as well as the connection routes essentially form a sorting device, each connection route providing a sorting path. In such a case, the verification marking V5, for example, can serve to query whether all transport carriers 3 to be sorted have passed the verification point, in particular in the correct order.

Figure 8:
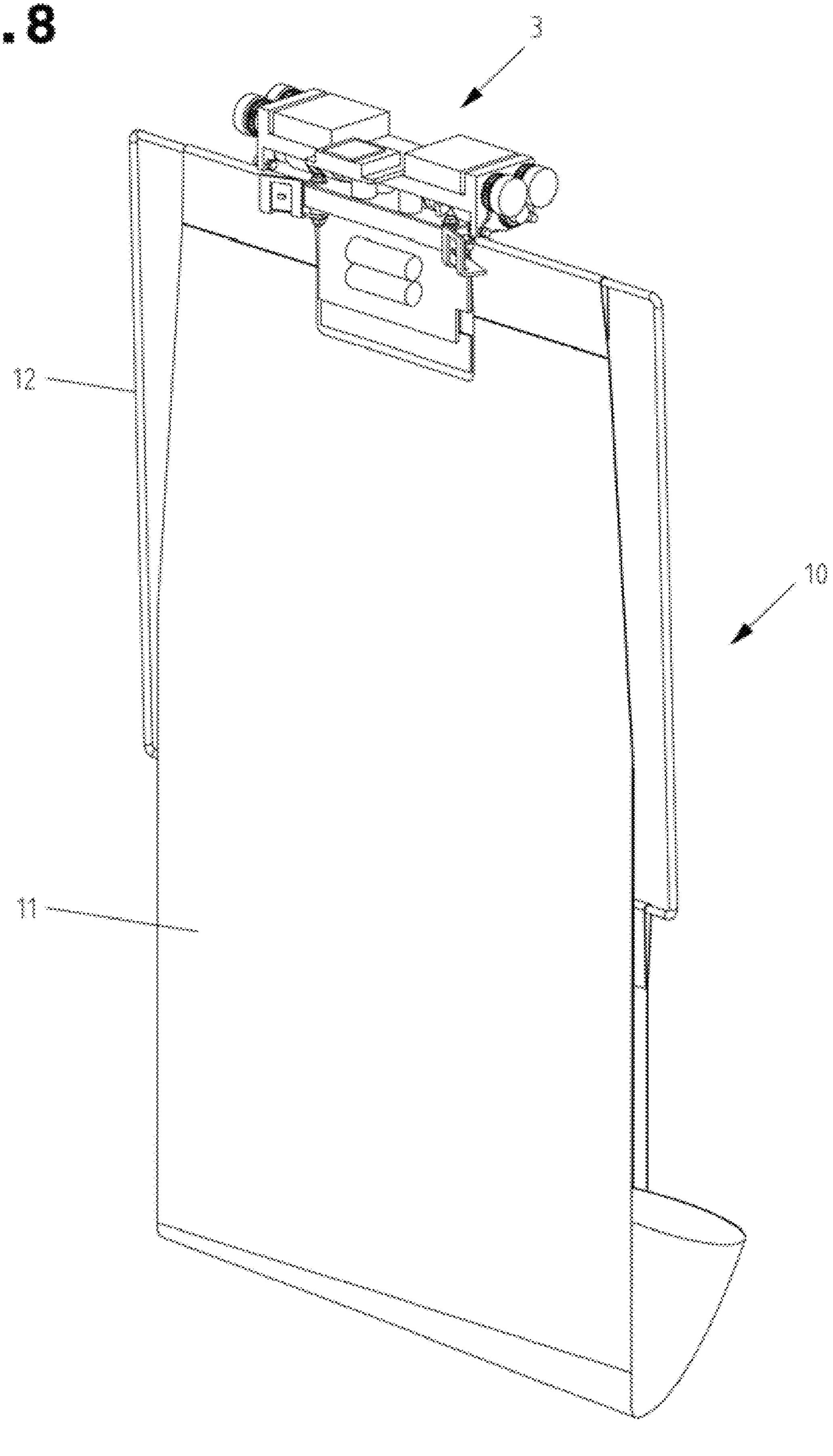
Figure 9:
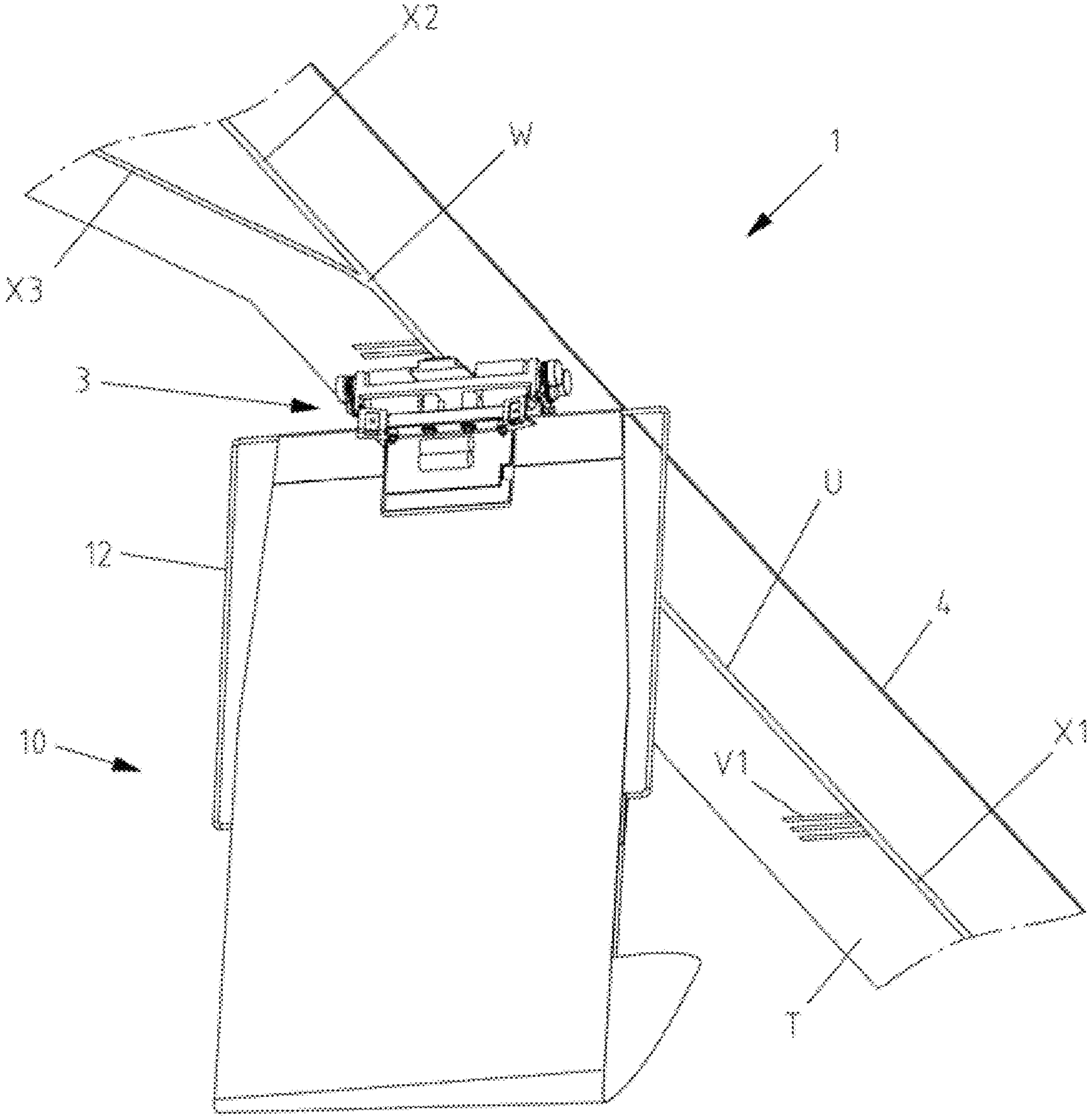
Figure 10:
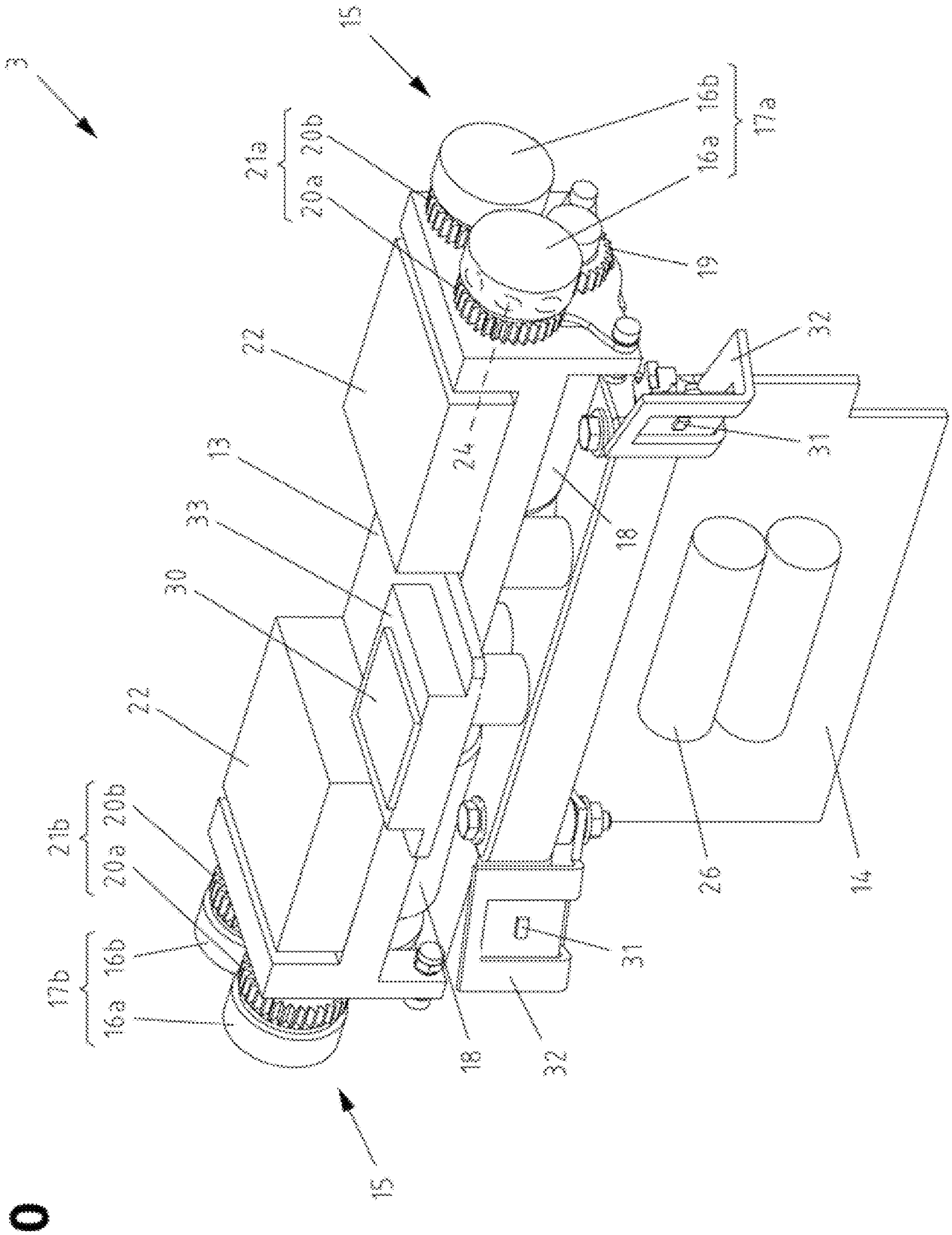
Figure 11:
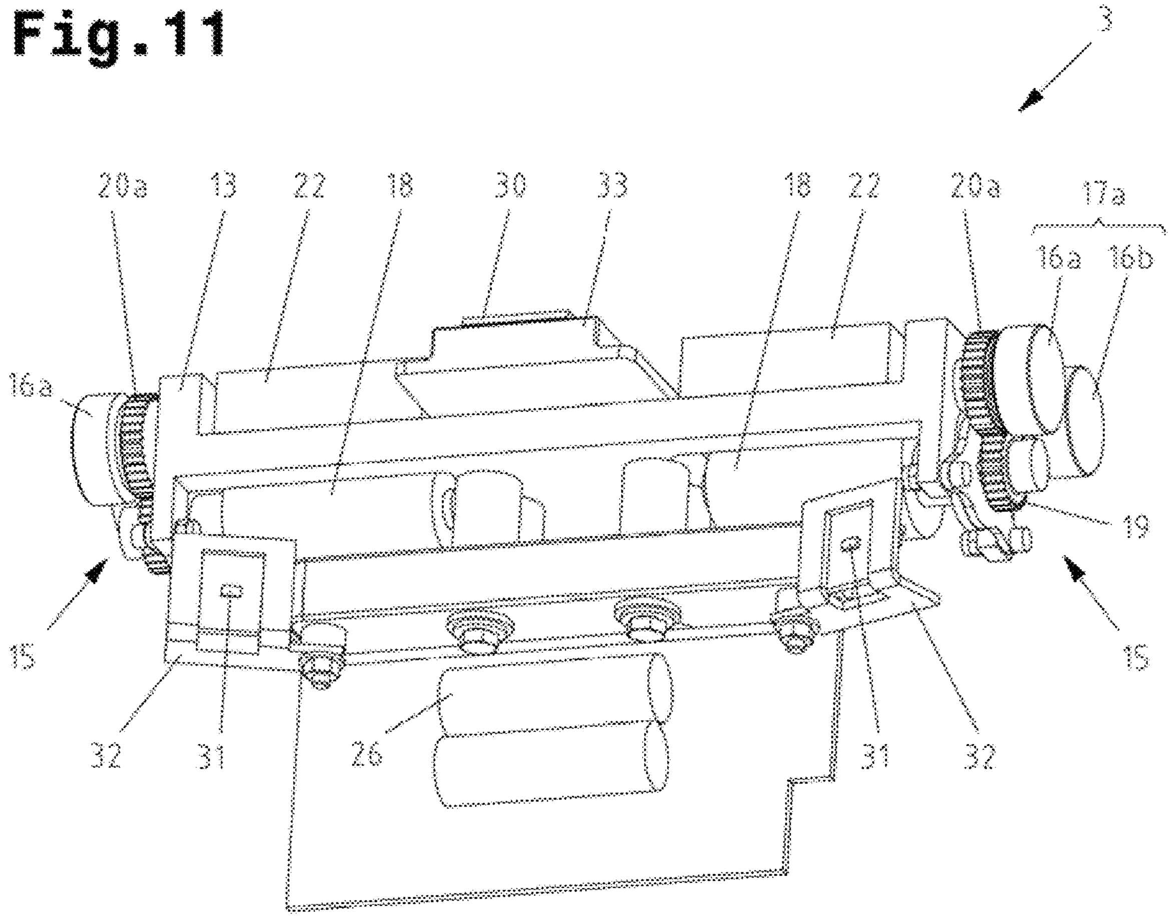
Figure 12:
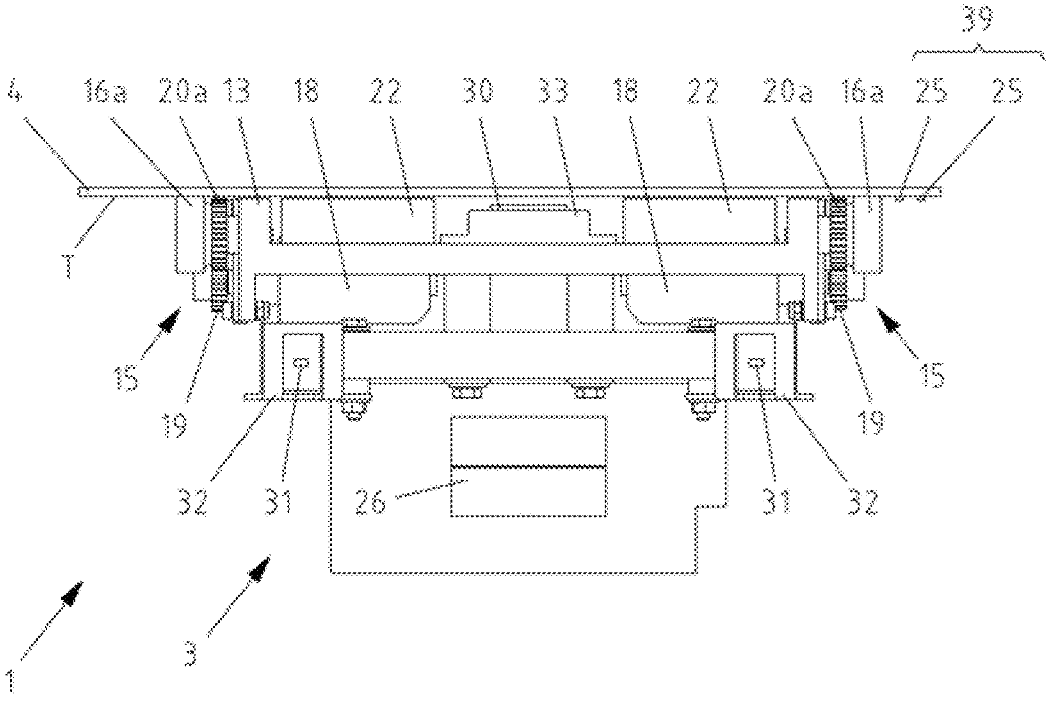

FIG. 8 to FIG. 12 schematically depict an overhead conveying device 1 for an order-picking system or a transport carrier 3 for transporting hanging articles 10. FIG. 8 shows the transport carrier 3 with a hanging article 10 in an oblique view from above, FIG. 9 shows the overhead conveying device 1 in an oblique view from below, FIG. 10 shows the transport carrier 3 in a detailed depiction in an oblique view from above, FIG. 11 shows a detailed depiction of the transport carrier 3 in an oblique view from below, and FIG. 12 shows the transport carrier 3 or the overhead conveying device 1 in a detailed depiction in a front view.

The overhead conveying device 1 comprises a support structure 4, which forms a driving surface T, and a transport carrier 3 for transporting hanging articles 10, the former forming a base body 13. The base body 13 forms a first transport carrier side and a second transport carrier side in particular opposite the first transport carrier side. The hanging article 10 comprises, for example, a transport bag with a bag body 11, which is secured to a hanger 12 and provided for storing an article not explicitly shown here. Alternatively, the hanging article 10 can also be formed by an item of clothing that hangs from the transport carrier 3 by way of a clothes hanger.

The transport carrier 3 can, as is the case in the example shown in FIG. 9, have a support body 14 with a receiving means for hanging up the hanging article 10. The receiving means can have a completely enclosed receiving means opening for hanging the hanger 12 of the hanging article 10. Alternatively, an open receiving means section (hook) could also be provided for hanging or hanging up the hanger 12 of the hanging article 10. The support body 14 can particularly be exchangeably fixed to the base body 13 via a connecting device.

The transport carrier 3 additionally comprises two drive devices 15 for moving the transport carrier 3 along the driving surface and a holding force generator, by means of which the transport carrier 3 held movably to the support structure 4 and in particular to the driving surface T.

The drive devices 15 each comprise drive elements, which abut the driving surface T, and a plurality of electrically operated motors 18, which are arranged on the base body 13. The drive elements in this example are in particular formed by drive wheels 16*a*, 16*b*. In the example shown, a first drive element on the first transport carrier side comprises a first drive wheel 16*a* and a second drive wheel 16*b*. Furthermore, a second drive element on the second transport carrier side comprises a first drive wheel 16*a* and a second drive wheel 16*b*.

Thus, two drive wheels 16*a*, 16*b* of a first pair of drive wheels 17*a*, which form the first drive element, are located on the first transport carrier side (right), and two drive wheels 16*a*, 16*b* of a second pair of drive wheels 17*b*, which form the second drive element, are located on the second transport carrier side (left). The drive wheels 16*a*, 16*b* of the first drive element are coupled to a first motor 18 of the electrically operated motors 18. In the same way, the drive wheels 16*a*, 16*b* of the second drive element are coupled to a second motor 18 of the electrically operated motors 18.

Two motors 18 are therefore provided in this example. However, it would also be conceivable for the drive elements to be coupled to one single motor 18.

The drive elements can be coupled to the electrically operated motors 18 via a motor pinion 19 seated on the respective motor 18 and via gear wheels 20*a*, 20*b* of a first gear wheel pair 21*a* and gear wheels 20*a*, 20*b* of a second gear wheel pair 21*b*. Specifically, the first gear wheel 20*a* of the first gear wheel pair 21*a* is arranged coaxially with the first drive wheel 16*a* of the first drive wheel pair 17*a*, the second gear wheel 20*b* of the first gear wheel pair 21*a* is arranged coaxially with the second drive wheel 16*b* of the first drive wheel pair 17*a*, the first gear wheel 20*a* of the second gear wheel pair 21*b* is arranged coaxially with the first drive wheel 16*a* of the second drive wheel pair 17*b*, and the second gear wheel 20*b* of the second gear wheel pair 21*b* is arranged coaxially with the second drive wheel 16*b* of the second drive wheel pair 17*b*.

In this case, the drive wheels 16*a*, 16*b* can be coupled to the motors 18 via gear wheel transmissions. The use of a traction drive would again also be conceivable here.

Although the drive of the transport carrier 3 is provided by motors 18 arranged on the transport carrier 3 in the example shown in FIG. 8 to FIG. 12, it would also be conceivable for the drive of the transport carrier 3 to be provided by means of the linear motor principle. For example, coils can be provided along the driving surface T and a short-circuit coil, an externally excited coil or a permanent magnet 22 on the transport carrier 3 such that the arrangement acts as a linear asynchronous motor or linear synchronous motor.

The transport carrier 3 further has one or more holding force generators, which can preferably comprise two permanent magnets 22 as shown by way of example in FIG. 8 to FIG. 12. The permanent magnets 22 or holding force generators are arranged on the base body 13 between the first transport carrier side and second transport carrier side.

The support structure 4 also forms the driving surface T and is preferably made of a (ferro) magnetic material. The support structure 4 or the driving surface T can be made of sheet steel, for example. With the aid of the permanent magnets 22, the transport carrier 3 held upside down to the driving surface T, wherein the transport carrier 3 is movable on the driving surface T.

Figure 13:
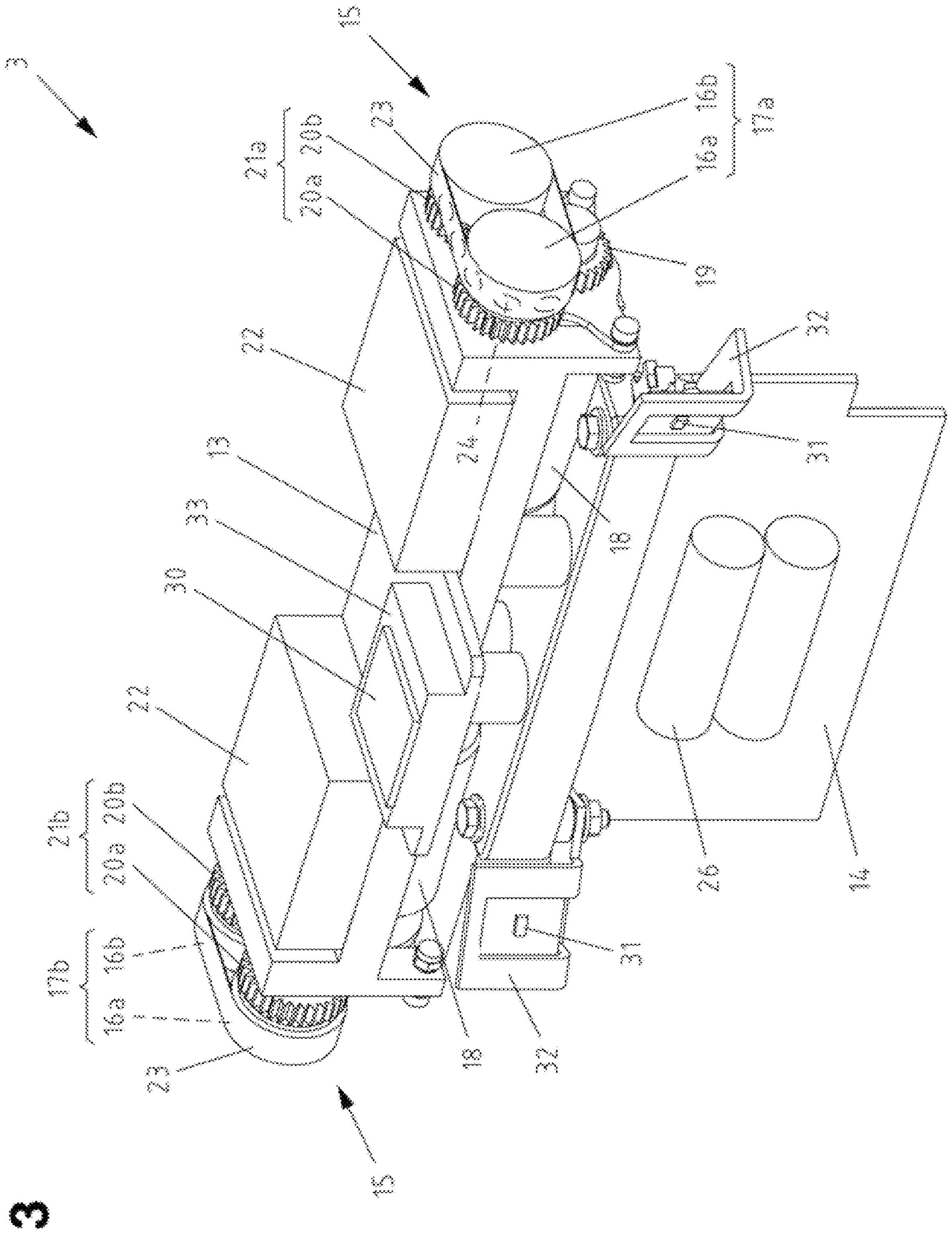

The drive elements in the example shown in FIG. 8 to FIG. 12 are formed by drive wheels 16*a*, 16*b*. However, this is not the only conceivable possibility. It would also be conceivable for the drive elements to comprise an endlessly circulating first crawler belt 23 guided around the drive wheels 16*a*, 16*b* of the first drive wheel pair 17*a* on the first transport carrier side and an endlessly circulating second crawler belt 23 guided around the drive wheels 16*a*, 16*b* of the second drive wheel pair 17*b* on the second transport carrier side as is the case in the example shown in FIG. 13.

Similarly, it would also be conceivable for chains to be provided instead of the crawler belts. The drive elements are then formed by a first endlessly circulating chain guided on the first transport carrier side around the drive wheels 16*a*, 16*b* of the first drive wheel pair 17*a* and by a second endlessly circulating chain guided on the second transport carrier side around the drive wheels 16*a*, 16*b* of the second drive wheel pair 17*b*.

The holding force generators in the example shown in FIG. 8 to FIG. 13 comprise permanent magnets 22. However, this is not the only conceivable possibility. It would also be conceivable for the holding force generators to comprise adhesive lamellae according to the gecko principle, suction cups and/or a Velcro strip of a Velcro fastening and thus hook 29, for example, or mushroom heads of a Velcro fastening, which are arranged on the outer circumference of the drive elements, i.e. on the circumference of the drive wheels or outside on the crawler belts or chains, for example. In FIG. 12, optional suction cups 24 are indicated by dashed circles on the drive wheel and in FIG. 13 by dashed circles on the crawler belt 23. In reality, the use of suction cups 24 is of course not limited to the drive wheel and the crawler belt 23. These can alternatively or additionally also be arranged on the other drive wheels and/or on the crawler belt 23. In the case of a Velcro fastening, a part of a Velcro strip can be arranged on the outer circumference of the drive elements. The other part of the Velcro fastening is then located on the driving surface T.

When using adhesive lamellae, suction cups 24 or a Velcro fastening, the permanent magnets 22 can be omitted or provided in addition to said holding force generators.

The embodiment of the overhead conveying device 1 or of the transport carrier 3 shown in FIG. 8 to FIG. 13 comprises an optional energy supply system 39, which has an insulator and exposed electrical conductors 25, which extend along the driving surface T and can be mounted thereon (explicitly depicted in FIG. 12). The transport carrier 3 can additionally have current collectors (not shown in FIG. 8 to FIG. 13), which are in electrical contact with the electrical conductors 25 and are connected electrically to the motors 18. The current collectors can, for example, be configured as sliding contacts that slide/brush on the electrical conductors 25 when the transport carrier 3 moves. The current collectors can, however, also be configured in the form of wheels or rollers and roll off the electrical conductors 25.

Instead of a contact-based energy transfer, a contactless energy transfer could also be provided using an inductive energy supply system, described below.

Furthermore, it can be provided that the energy supply system 39 is only provided on straight route sections of the guide rail. The energy supply system 39 can thereby be configured more simply.

Optionally, on curves and diverters, the motor 18 can be supplied from an energy storage 26 (also see FIG. 15 in this regard). This can be provided irrespective of whether the energy supply system 39 is configured for contact-based or contactless energy transfer.

For this purpose, it can also be provided that the transport carrier 3 and/or the hanging article 10, in particular the transport bag has/have an energy storage 26 connected electrically to the motors 18 or an energy source connected electrically to the motors 18. The position of the energy storage 26 indicated in FIG. 8 to F is not mandatory. Instead, the energy storage 26 can, for example, also be installed in a housing of a control unit 33 (see also FIG. 15).

In particular, the motors 18 are connected to the energy storage 26 or the energy source via switch elements or control elements. The energy storage 26 can, for example, be configured as a rechargeable battery. The energy source can be configured as a solar module.

Alternatively to the electrical conductors 25, which as previously described function as sliding conductors, an inductive energy supply system can be provided along the support structure 4 or along the driving surface T, and the energy transfer to the motor 18 (and where applicable to a charging connection of an energy source connected to the motor 18) of the transport carrier 3 can be performed inductively.

In particular, the inductive energy supply system can have one or more electrical conductors 25 extending parallel to the support structure 4 or the driving surface T, and a coil arranged on the transport carrier 3 can be connected electrically to the motor 18, wherein the energy transfer to the coil is contactless. The transport carrier 3 particularly preferably comprises a ferromagnetic core, around which the coil is wound, and which at least partially surrounds the at least one electrical conductor 25. The ferromagnetic core and the coil can additionally be protected by a housing.

If the holding force generators comprise permanent magnets 22 and the support structure 4 is made of a (ferro) magnetic material, it is advantageous for the electrical conductors 25 to be arranged below the support structure 4 as shown in FIG. 12. It would also be conceivable for the electrical conductors 25 to be arranged above the support structure 4, specifically above an insulating region of the support structure 4, or also if the support structure 4 were made entirely of an insulating material. In this case, adhesive lamellae, suction cups and/or a Velcro fastening should be provided as holding force generators.

If the energy supply system 39 of the overhead conveying device 1 (i.e. the sliding conductor or the inductive energy supply system) is also configured for wired communication with the driving control 34 of the transport carrier 3, it can advantageously be provided that the energy supply system 39 of the overhead conveying device 1 is divided into a plurality of supply segments Y1 . . . Y4, which have different addresses in a communication system of the overhead conveying device 1, as symbolically depicted in FIG. 4.

A local position can also be assigned to a supply segment Y1 . . . Y4 of the energy supply system 39, wherein moving the transport carrier 3 into this supply segment Y1 . . . Y4 effects an adjustment of the path definition starting from said position by the superordinate controller 6 when a desired position of the transport carrier 3 does not match the local position of the supply segment Y1 . . . Y4 of the energy supply system 39. Selecting a specific path corresponding to the path definition stored in the memory 35 then leads to incorrect switching and misrouting in the case of the specified deviation. By means of the proposed measures, a deviation of the actual position of the transport carrier 3 from the position of the transport carrier 3 assumed by the driving control 34 can be taken into account and the desired position of the transport carrier 3 corrected again, i.e. set to its actual position (in this case, to the position of the supply segment Y1 . . . Y4 into which the transport carrier moves).

In the example shown in FIG. 4, no supply segment Y1 . . . Y4 is provided in the region of the diverter section W. Instead, the transport carrier 3 is supplied from the energy storage 26 there. However, this is not mandatory, but a supply segment Y1 . . . Y4 could also be provided in the region of the diverter.

Figure 14:
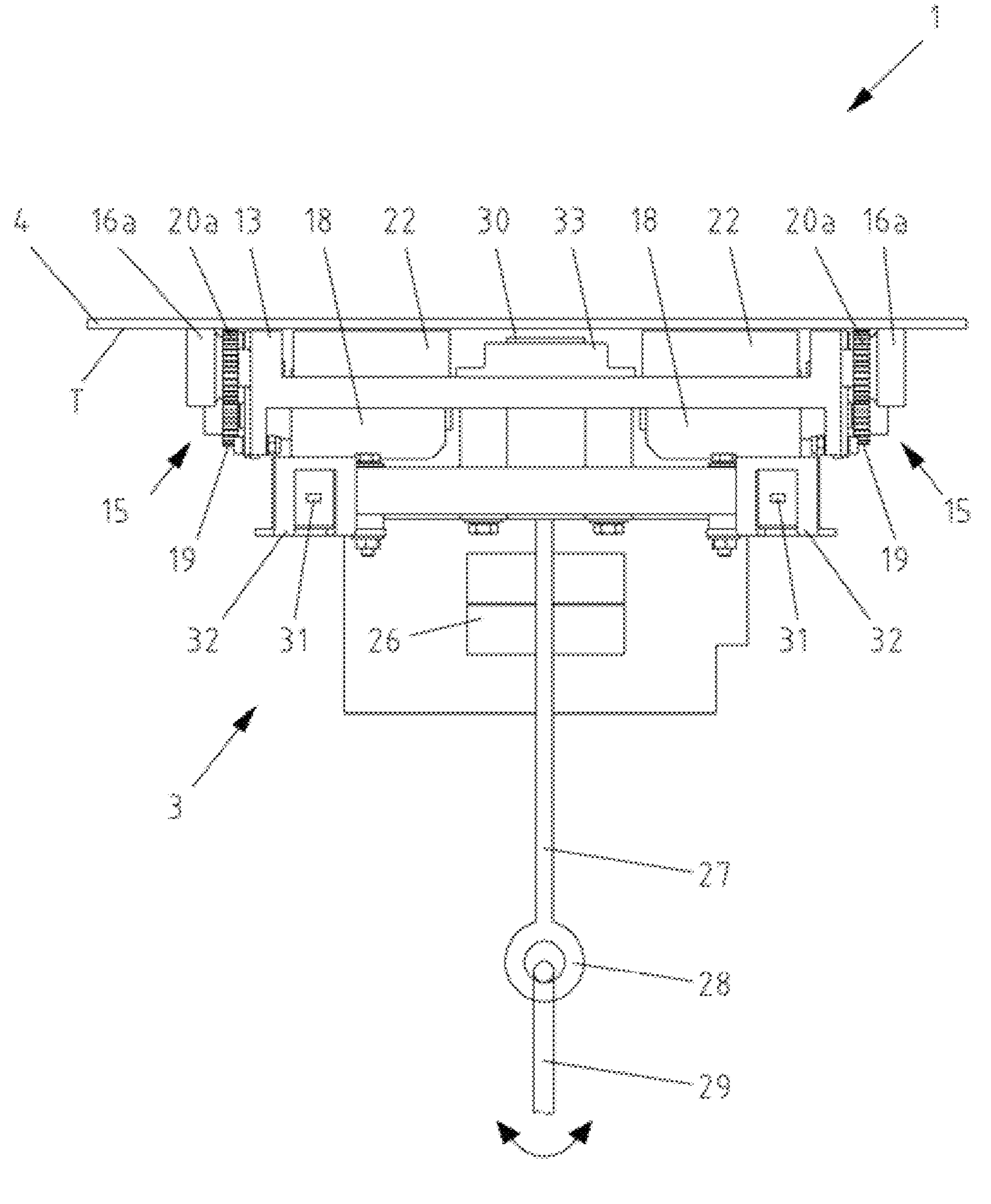

It is also conceivable for the driving surface T not to be aligned horizontally as shown in FIG. 9 and FIG. 12, but to extend obliquely or even be aligned vertically, i.e. to form a wall in principle. The transport carriers 3 held to the driving surface T can also move on this wall. A space-saving storage surface for the transport carriers 3 can be formed in this way, for example. In this context in particular, it is advantageous for the transport carrier 3 to comprise a joint arrangement that allows the hanging article 10 to be pivoted relative to the base body 13 by more than 45° and in particular by more than 90° transverse to the direction of movement of the transport carrier 3. This is shown in FIG. 14. In this case, the transport carrier 3 comprises an extension rod 27 with a eyelet 28 arranged thereon and a hook 29 of a hanging article 10 rotatably mounted therein. This can pivot both in the longitudinal direction and in the transverse direction (see the double arrow) due to the suspension. By appropriately selecting the length of the extension rod 27, it is possible, in particular, to determine the lateral pivoting angle.

The overhead conveying device 1 has further features. This specifically relates to the driving marking U and the control marking V1 . . . V5 attached to the driving surface T, as well as the driving surface sensor 30 arranged on the transport carrier 3. Furthermore, the transport carrier 3 can comprise a plurality of, in particular two, distance sensors 31, which are mounted on the base body 8 by means of sensor supports 32. FIG. 9 also shows that the driving marking U is divided into a diverter section W and three movement routes X1 . . . X3, in particular the infeed route X1 and the outfeed routes X2, X3.

As can be seen in FIG. 15, the transport carrier 3 can comprise a control unit 33 with a driving control 34 configured as a microcontroller, for example, a memory (data and/or program memory) 35 connected thereto and, optionally, power electronics 36 connected to the driving control 34 and a communication module 37 connected to the driving control 34.

The driving control 34 or the communication module 37 can be configured for optical, radio-based or wired communication, in particular for communication via the energy supply system 39 in accordance with the power-line communication technology.

Furthermore, the control unit 33 can comprise an energy management module 38 and the energy storage 26 connected thereto.

The driving surface sensor 30 and the distance sensor 31 (or both distance sensors 31 insofar as two distance sensors 31 are provided) can also be connected to the driving control 34.

Both motors 18 (or only the motor 18 in the case of only one motor 18) can be connected to the power electronics 36. Furthermore, the energy management module 38 and the communication module 37 are preferably connected to the energy supply system 39 or part thereof.

At this point, it is noted that the block diagram shown in FIG. 15 as well as the function of the control unit 33 relate not only to the transport carrier 3 described above, but to all construction types of transport carriers 3.

The function of the transport carrier 3 equipped in this way is as follows:

As specified, the transport carrier 3 has a driving control 34 and a memory 35 configured to be writeable and readable connected thereto. In particular, the driving control 34 can be configured to influence, control or regulate a movement of the transport carrier 3 on the support structure 4 on the basis of movement data stored or deposited in the memory 35.

For example, the driving control 34 of the transport carrier 3 can be configured to regulate a speed of the transport carrier 3. The motors 18 are correspondingly actuated by the driving control 34 for this purpose. Specifically, the power electronics 36 connected to the motors 18 are actuated by the driving control 34, the former obtaining the electrical energy required to power the motors 18 from the energy supply system 39 or the energy storage 26 via the energy management module 38.

The detecting unit or the driving surface sensor 30 can be used to guide the transport carrier 3 along the driving marking U. The driving marking U can, for example, be a line painted, printed or glued onto the driving surface T, which has a different brightness and/or color than the rest of the driving surface T. The driving marking U can be black on a light background, for example. In this case, the driving surface sensor 30 is configured as an optical driving surface sensor 30, for example as a sensor array of a plurality of optical sensors. By evaluating the sensor signal, directional corrections or changes in direction can be derived for the transport carrier 3. A directional correction or change of direction is executed by differing actuation of the motors 18. Different rotational speeds cause the transport carrier 3 to move in a curve.

It would also be conceivable for the driving marking U to be configured as a magnetic strip and the driving surface sensor 30 as a magnetic sensor (in particular as a Hall sensor). The transport carrier 3 can also be guided along the driving marking U in this way.

If the transport carrier 3 has one or more distance sensors 31, the distance sensor 31 (or the distance sensors 31) can be configured to measure a distance to another transport carrier 3 moving ahead and connected to the driving control 34. In this case, the driving control 34 can be configured to regulate a distance to the other transport carrier 3 moving ahead on the basis of the distance measured by the distance sensor 31 (or by the distance sensors 31). The distance sensor 31 can be configured as an ultrasonic sensor, for example.

The two distance sensors 31 are advantageously arranged at an exemplary acute angle (greater than 0° and less than) 90° to one another in this example. As a result, the distance to a transport carrier 3 moving ahead can also be measured well in curves or in the diverter section W. In each case, the signal of the distance sensor 31 pointing into the interior of the curve is preferably or exclusively evaluated. Generally, however, an angle greater than 0° and less than 180° between the two distance sensors 31 would also be possible.

The driving control 34 of the transport carrier 3 can also be configured to regulate a speed of the transport carrier 3 and/or to regulate a distance from another transport carrier 3.

It is also conceivable that the movement of the transport carrier 3 on the support structure 4 is influenced by means of the control marking V1 . . . V5. This can be optically or magnetically applied to the driving surface T and read by the driving surface sensor 30 or another sensor provided for this purpose, wherein the same considerations apply as for the driving marking U.

For example, the control marking V1 . . . V5 can mean that the transport carrier 3 should change (i.e. increase or decrease) its speed when it detects the control marking V1 . . . V5, change the distance to a transport carrier 3 moving ahead (i.e. increase or decrease) or stop. In this case, the control marking V1 . . . V5 provides a regulation marking V3 described above, which essentially regulates movement dynamics of the transport carrier 3. The control marking V1 . . . V5 can also mean that the transport carrier 3 should continue its movement at the diverter section W starting from the infeed route X1 or first movement route X1 along one of the outfeed routes X2, X3 in particular along the second movement route X2 or along the third movement route X3. In this case, the control marking V1 . . . V5 provides a query marking V1 described above.

Setting of a desired speed of the transport carrier 3 or of a desired distance of the transport carrier 3 from another transport carrier 3 can also be caused by a control marking V1 . . . V5, which is arranged in the region of the support structure 4 so as to be detected by the transport carrier 3.

The driving surface sensor 30 of the transport carrier 3 in this example is, in sum, a light-sensitive element 7 connected to the driving control 34, with which an optical driving marking U is attached to the support structure 4 and/or optical control marking V1 . . . V5 is readable, with which a movement of the transport carrier 3 on the support structure 4 can be influenced. The optical marking can be configured as a movement line or driving marking U on the driving surface T of the support structure 4, however it can also be configured as a control element or control marking V1 . . . V5 for the transport carrier 3 and function as a turn-off point when the control marking V1 . . . V5 influences the movement direction of the transport carrier 3 or as a stop point when the control marking V1 . . . V5 causes the transport carrier 3 to stop. The optical control marking V1 . . . V5 can particularly also be configured as a barcode or QR code. In addition, the optical control marking V1 . . . V5 can also be configured to be longer and act on a plurality of successive transport carriers 3.

It would also be conceivable for the track marking U, V1 . . . V5, in particular the driving marking U and/or the control marking V1 . . . V5, not to be attached to the support structure 4 in a fixed manner, but to be configured as a controllable light source, via which a control command can be transferred from the light source to the driving surface sensor 30 or to another light-sensitive element 7 of the transport carrier 3, and thus from the support structure 4 to the driving control 34 of the transport carrier 3. The controllable light source on the support structure 4 can have a plurality of individually activatable luminous dots arranged in the form of a matrix, for example. As a result of the proposed measures, the control commands transferred to the transport carrier 3 are not fixed, but can be flexibly adapted to a specific situation.

For example, the control marking V1 . . . V5 can optionally be used to change the speed of the transport carrier 3 as necessary, to change the distance from a transport carrier 3 moving ahead as necessary, to stop the transport carrier 3 as necessary and/or to control the movement direction or the path of the transport carrier 3 in the diverter section Was necessary. The driving marking U can flexibly influence the movement direction or the path of the transport carrier 3. By accordingly specifying the speed of the transport carrier 3 and the distance of the transport carrier 3 to another transport carrier 3 moving ahead, a specific throughput of transport carriers 3 can also be specified or achieved. For example, said speed and said distance can be reduced on curves and increased on straights. Said throughput can thereby be kept particularly constant.

Not only the actuation of the transport carrier 3 by the track marking U, V1 . . . V5 is conceivable, for example a driving marking U and/or control marking V1 . . . V5 on the support structure 4, but also the actuation of (fixed) elements of the overhead conveying device 1 by the transport carrier 3. In other words, the driving control 34 can be configured to influence a movement of a control element of the support structure 4 on the basis of control data stored or deposited in the memory 35.

For example, the transport carrier 3 can have a light source connected to the driving control 34 and the control element of the support structure 4 a light-sensitive element 7, wherein a control command can be transferred from the driving control 34 of the transport carrier 3 to the control element of the support structure 4 with the light source via the light-sensitive element 7.

As a result of the proposed measures, it is possible for the transport carrier 3, in particular as described above, to move autonomously across the transport network formed by the support structure 4.

It is particularly possible for the transport carrier 3 to move along the transport path S from a starting point, for example a charging station or storage for hanging articles, to a desired destination, for example an order-picking station. In this case, route planning can be performed by the superordinate controller 6, wherein an entire route from starting point to desired destination is substantially segmented or divided into sub-routes, which each extend to a notification marking V2 or from the last notification marking V2 to the desired destination. As a result, the transport carrier 3 can be navigated in a particularly flexible manner through the transport network.

Finally, it is further stated that the scope of protection is determined by the claims. However, the description and the drawings are to be referenced for the interpretation of the claims. Individual features or combinations of features from the various exemplary embodiments shown and described can represent independent inventive solutions in themselves.

It is also particularly stated that the devices shown can, in reality, also comprise more or even fewer components than those shown. In some cases, the devices shown or their components have not been shown to scale and/or enlarged and/or shrunk.

The invention claimed is:

1. An overhead conveying device for an order-picking system comprising a support structure having a driving surface, a transport carrier for transporting a hanging article, the transport carrier having:

a base body with a first transport carrier side and a second transport carrier side, and a holding force generator, the transport carrier being movably held to the support structure by the holding force generator, and a drive device for moving the transport carrier along the driving surface, the drive device including a first drive element resting on the driving surface and a second drive element resting on the driving surface, wherein the first drive element is arranged on the first transport carrier side and the second drive element is arranged on the second transport carrier side, and wherein the holding force generator comprises a permanent magnet or an electromagnet arranged on the base body between the first transport carrier side and the second transport carrier side, and wherein the generation of a holding force takes place contactlessly by the permanent magnet or the electromagnet.

2. The overhead conveying device according to claim 1, characterized in that the first and second drive elements each comprise one or more drive wheels.

3. The overhead conveying device according to claim 2, characterized in that the first drive element comprises an endlessly circulating first crawler belt guided on the first transport carrier side around the drive wheels of the first drive element, and/or the second drive element comprises an endlessly circulating second crawler belt guided on the second transport carrier side around the drive wheels of the second drive element.

4. The overhead conveying device according to claim 2, characterized in that the first drive element comprises an endlessly circulating first chain guided on the first transport carrier side around the drive wheels of the first drive element, and/or the second drive element comprises an endlessly circulating second chain guided on the second transport carrier side around the drive wheels of the second drive element.

5. The overhead conveying device according to claim 1, characterized in that the support structure forms the driving surface and is made of a ferromagnetic material, wherein the transport carrier is movably held to the driving surface via the permanent magnet.

6. The overhead conveying device according to claim 1, characterized in that the transport carrier comprises a joint arrangement that allows the hanging article to be pivoted relative to the base body by more than 45° transverse to the direction of movement of the transport carrier.

7. The overhead conveying device according to claim 1, characterized in that the transport carrier has an energy storage electrically connected to the motor and/or an energy source electrically connected to the motor.

8. The overhead conveying device according to claim 1, characterized in that the overhead conveying device comprises the hanging article, wherein the hanging article has a transport bag with a bag body for storing an article.

9. The overhead conveying device according to claim 8, characterized in that the transport bag has an energy storage electrically connected to the motor and/or an energy source electrically connected to the motor.

10. The overhead conveying device according to claim 1, characterized by an electrical energy supply system comprising an insulator and exposed electrical conductors that are arranged along the support structure, wherein the transport carrier has current collectors that are in electrical contact with the conductors and are electrically connected to the motor.

11. The overhead conveying device according to claim 1, characterized in that an inductive energy supply system is arranged along the support structure, and the energy transmission to the motor of the transport carrier is inductive.

12. The overhead conveying device according to claim 11, characterized in that the inductive energy supply system comprises at least one electrical conductor extending parallel to the support structure and a coil, which is arranged on the transport carrier and is electrically connected to the motor, wherein the energy transmission to the coil takes place in a contactless manner.

13. The overhead conveying device according to claim 12, characterized in that the transport carrier comprises a ferromagnetic core, around which the coil is wound and which at least partially surrounds the at least one electrical conductor.

14. The overhead conveying device according to claim 10, characterized in that the electrical energy supply system is provided only on straight route sections of the support structure.

15. The overhead conveying device according to claim 1, characterized in that the transport carrier has a driving control and an electronic memory connected to the driving control.

16. The overhead conveying device according to claim 15, characterized in that the transport carrier has a plurality of distance sensors, which are connected to the driving control and are arranged in such a way that they form an angle greater than 0° and less than 180° in pairs.

17. The overhead conveying device according to claim 15, characterized in that the support structure forms the driving surface, along which a transport path is arranged, and in that a superordinate controller, at least one distribution module, and the transport carrier for transporting a hanging article along the transport path are provided, wherein the transport path has a diverter section with a node, an infeed route leading to the node, a first outfeed route leading away from the node and a second outfeed route leading away from the node, wherein the infeed route and the first outfeed route provide a first path for a transport carrier and the infeed route and the second outfeed route provide a second path for the transport carrier, wherein the at least one distribution module comprises a track marking and a communication unit of the superordinate controller, wherein the track marking is arranged along the transport path on the support structure and has a query marking, which is assigned to the diverter section and arranged along the infeed route, and has a notification marking, and wherein the communication unit is arranged in the region of the notification marking and is configured to send a driving specification, which comprises a release instruction and/or a path definition for the transport carrier, and wherein the driving control of the transport carrier is configured to receive a driving specification sent by the communication unit of the at least one distribution module, to store it in the memory of the transport carrier, to access the driving specification from the memory, and to actuate the transport carrier according to the driving specification.

18. The overhead conveying device according to claim 15, characterized in that the support structure has at least one control element, and the driving control is configured to control a movement of the at least one control element of the support structure on the basis of control data stored in the electronic memory.

19. The overhead conveying device according to claim 18, characterized in that the driving control of the transport carrier and/or the at least one control element of the support structure is configured for optical, wired or radio-based communication.

20. The overhead conveying device according to claim 15, characterized in that the transport carrier has a light source connected to the driving control and the control element of the support structure has a light-sensitive element, wherein a control command can be transmitted from the driving control of the transport carrier to the control element of the support structure with the light source via the light-sensitive element.

21. The overhead conveying device according to claim 19, characterized in that the support structure has a controllable light source and the transport carrier has an optical driving surface sensor connected to the driving control, wherein a control command can be transmitted from the support structure to the driving control of the transport carrier by the light source and the optical driving surface sensor.

22. The overhead conveying device according to claim 21, characterized in that the controllable light source on the transport carrier or the support structure has a plurality of individually activatable luminous dots arranged in the form of a matrix.

23. The overhead conveying device according to claim 20, characterized in that the transport carrier comprises a driving surface sensor connected to the driving control, with which a control marking arranged on the support structure can be read, wherein detecting the control marking triggers notification of the driving control to a superordinate controller, or a short-range radio receiver connected to the driving control, with which a signal of a short-range radio transmitter arranged on the support structure can be received, wherein receiving the signal by the short-range radio receiver triggers notification of the driving control to a superordinate controller, or a short-range radio transmitter, wherein receiving a signal from the short-range radio transmitter of the transport carrier by a short-range radio receiver arranged on the support structure triggers notification of the transport carrier to a superordinate controller.

24. The overhead conveying device according to claim 23, characterized in that the notification of the driving control to the superordinate controller causes the superordinate controller to send a path definition to the driving control.

25. The overhead conveying device according to claim 23, characterized in that the track marking or the short-range radio transmitter arranged on the support structure or the short-range radio receiver arranged on the support structure are configured to effect the simultaneous notification of the driving controls of a plurality of transport carriers to the superordinate controller.

26. The overhead conveying device according to claim 1, characterized in that the overhead conveying device comprises an energy supply system, which is also configured for wired communication with the driving control of the transport carrier.

27. The overhead conveying device according to claim 26, characterized in that the electrical energy supply system comprises an insulator and exposed electrical conductors, which are arranged along the support structure, wherein the transport carrier has current collectors, which are in electrical contact with the conductors and are both electrically connected to a motor of the drive device and are electrically connected to the driving control via a communication module of the transport carrier.

28. The overhead conveying device according to claim 24, characterized in that an inductive energy supply system is provided along the support structure, and the energy transmission to a motor of the drive device of the transport carrier and/or a data transmission to a communication module of the transport carrier connected to the driving control is inductive.

29. The overhead conveying device according to claim 1, characterized in that the drive device further comprises:

an electrically powered first motor coupled to the first drive element, and an electrically powered second motor coupled to the second drive element.

30. An overhead conveying device for an order-picking system comprising a support structure which forms a driving surface, a transport carrier for transporting a hanging article, the transport carrier having:

a base body with a first transport carrier side and a second transport carrier side, and a holding force generator, the transport carrier being movably held to the support structure by the holding force generator, and a drive device for moving the transport carrier along the driving surface, wherein a holding force is generated by contact of the holding force generator with the driving surface, and wherein the holding force generator comprises adhesive lamellae, suction cups and/or a Velcro strip of a Velcro fastening.

31. The overhead conveying device according to claim 30, characterized in that the transport carrier has a driving control and an electronic memory connected to the driving control.

32. The overhead conveying device according to claim 30, characterized in that the support structure forms the driving surface, along which a transport path is arranged, and in that a superordinate controller, at least one distribution module, and the transport carrier for transporting the hanging article along the transport path are provided, wherein the transport path has a diverter section with a node, an infeed route leading to the node, a first outfeed route leading away from the node and a second outfeed route leading away from the node, wherein the infeed route and the first outfeed route provide a first path for a transport carrier and the infeed route and the second outfeed route provide a second path for the transport carrier, and wherein the at least one distribution module comprises a track marking and a communication unit of the superordinate controller, and wherein the track marking is arranged along the transport path on the support structure and has a query marking, which is assigned to the diverter section and arranged along the infeed route, and has a notification marking, and wherein the communication unit is arranged in the region of the notification marking and configured to send a driving specification, which comprises a release instruction and/or a path definition for the transport carrier, and wherein the driving control of the transport carrier is configured to receive a driving specification sent by the communication unit of the at least one distribution module, to store it in the memory of the transport carrier, to access the driving specification from the memory, and to actuate the transport carrier according to the driving specification.

33. The overhead conveying device according to claim 30, characterized in that the holding force generator additionally comprises a permanent magnet or an electromagnet.

34. The overhead conveying device according to claim 33, characterized in that the support structure forms the driving surface and is made of a ferromagnetic material, wherein the transport carrier is movably held to the driving surface via the permanent magnet.

* * * * *